United States Patent
Yamamoto

(10) Patent No.: US 7,471,416 B2
(45) Date of Patent: Dec. 30, 2008

(54) SIGNAL PROCESSING UNIT HAVING A DIGITAL CIRCUIT FOR PROCESSING IMAGE SIGNALS OUTPUTTED FROM AN IMAGE CAPTURING ELEMENT

(75) Inventor: Hiroyuki Yamamoto, Kanagawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 875 days.

(21) Appl. No.: 10/946,505

(22) Filed: Sep. 21, 2004

(65) Prior Publication Data

US 2005/0213165 A1   Sep. 29, 2005

(30) Foreign Application Priority Data

Mar. 26, 2004   (JP)   .............................. 2004-092549

(51) Int. Cl.
H04N 1/60 (2006.01)
H04N 1/40 (2006.01)
H04N 1/38 (2006.01)

(52) U.S. Cl. .......................... 358/1.9; 358/445; 358/463

(58) Field of Classification Search ................. 358/445, 358/463
See application file for complete search history.

(56) References Cited

U.S. PATENT DOCUMENTS

| | | | | |
|---|---|---|---|---|
| 5,402,249 A | * | 3/1995 | Koseki et al. | ................ 358/446 |
| 5,748,335 A | * | 5/1998 | Honma et al. | ................ 358/445 |
| 5,781,312 A | * | 7/1998 | Noda | .......................... 358/482 |
| 6,961,151 B1 | * | 11/2005 | Nara | .......................... 358/3.26 |
| 7,161,626 B1 | * | 1/2007 | Nara | .......................... 348/243 |
| 7,336,394 B2 | * | 2/2008 | Tsujimoto | ................... 358/1.9 |

FOREIGN PATENT DOCUMENTS

| | | |
|---|---|---|
| JP | 10-233903 | 9/1998 |
| JP | 2002-057581 A | 2/2002 |

* cited by examiner

Primary Examiner—Twyler L Haskins
Assistant Examiner—Fred Guillermety
(74) Attorney, Agent, or Firm—Frishauf, Holtz, Goodman & Chick, P.C.

(57) ABSTRACT

There is described a signal processing apparatus, which conducts processing of a signal outputted from an image capturing element that converts an optical image obtained by irradiating light on an object such as document to an electric signal. The apparatus includes: a sample-and-hold section to sample and hold a black signal level and an image signal level, both included in an analogue image signal inputted from an image capturing element; an analogue-to-digital converting section to convert the analogue image signal to digital image data within a predetermined number of conversion steps, which is larger than a number of conversion steps corresponding to a differential value between the black signal level and the image signal level; and a digital subtracting section to subtract black digital-image data representing the black signal level from signal digital-image data representing the image signal level, both being converted by the analogue-to-digital converting section.

7 Claims, 19 Drawing Sheets

SIGNAL PROCESSING UNIT HAVING A DIGITAL CIRCUIT FOR PROCESSING IMAGE SIGNALS OUTPUTTED FROM AN IMAGE CAPTURING ELEMENT

BACKGROUND OF THE INVENTION

The present invention relates to a signal processing unit, particularly to processing of a signal outputted from an image capturing element (hereinafter, also referred to as an imaging device) that converts an optical image obtained by irradiating light on an object such as document to an electric signal.

There is available an image reader that converts an optical image obtained by irradiating light on an object such as document to an electric signal so as to obtain image data. This type of image reader is equipped with a signal processing unit that converts an optical image to an analog image signal by means of an imaging device such as CCD (charge coupled device) and then converts the analog image signal to a digital image signal so as to obtain image data.

In processing an analog signal, because waveform itself is a piece of data, there is a problem that the data cannot be transmitted if the waveform is distorted by incoming noise.

An analog signal outputted from an imaging device is converted into a digital image signal generally after being subjected to signal processing including the clamp processing for direct-current regeneration of the signal by cutting off a direct-current component and then adding a specified direct-current potential to stabilize a black level, sample-and-hold processing for sensing an image signal level, and signal amplification processing for matching the signal with a conversion range. However, because analog image signal is apt to be affected by noise, the linearity to the density of document is lost and so the image data to be processed cannot be free from distortion. Accordingly, it is difficult to obtain accurate image data.

In order to eliminate the above defect, there has been disclosed an image input system in which the processing for converting the output voltage of the density area to be obtained from a photoelectric converter to digital data is performed in two steps by the means of adjusting the output of the photoelectric converter and by the means of processing digital signal (refer to the Patent Document 1).

It is difficult to eliminate superposition of noise on the signal simply by means of analog signal processing. However, since digitalization involves a problem that higher voltage power supply is needed or that sufficient dynamic range cannot be realized, there has been disclosed a sampling processing unit, comprising a sample-and-hold circuit and an A/D conversion circuit installed after the sample-and-hold circuit, wherein the A/D conversion circuit is equipped with multiple latch circuits and either addition or subtraction is performed on the input signal and delayed output signal of the latch circuits (refer to the Patent Document 2).

[Patent Document 1]
  Tokkaihei 10-233903 (Japanese Patent Application Laid-open Publication)
[Patent Document 2]
  Tokkai 2002-57581 (Japanese Patent Application Laid-open Publication)

However, the technique disclosed in the Patent Documents 1 and 2 is how to digitalize the analog image signal effectively and accurately, and so it is based on effective utilization of the A/D conversion means. Besides, the signal amplification and black level adjustment employed in the analog signal processing are not digitalized yet. Accordingly, waveform is distorted due to the noise generated during signal processing and therefore image data may not possibly be transferred accurately, resulting in a problem that horizontal lines or uneven density is caused along the line progression direction and hence the image quality deteriorates when image data obtained from an imaging device is recorded on a recording medium.

SUMMARY OF THE INVENTION

To overcome the abovementioned drawbacks in conventional signal-processing apparatus, it is an object of the present invention to provide a signal-processing apparatus, which is less expensive, resistive against noise, and provides improved signal quality, by digitalizing a circuit for processing image signals outputted from the image capturing element so as to make the integration of the circuit easy.

Accordingly, to overcome the cited shortcomings, the abovementioned object of the present invention can be attained by signal-processing apparatus described as follow.

(1) An apparatus for processing signals, comprising: a sample-and-hold section to sample and hold a black signal level and an image signal level, both included in an analogue image signal inputted from an image capturing element; an analogue-to-digital converting section to convert the analogue image signal to digital image data within a predetermined number of conversion steps, which is larger than a number of conversion steps corresponding to a differential value between the black signal level and the image signal level, both acquired by sample-and-hold actions performed in the sample-and-hold section; and a digital subtracting section to subtract black digital-image data representing the black signal level from signal digital-image data representing the image signal level, both being converted by the analogue-to-digital converting section.

(2) The apparatus of item 1, further comprising: a digital image data processing section to process the digital image data inputted from the digital subtracting section; wherein the predetermined number of conversion steps is calculated, according to the relationship as follow, $$Na \geq Nt \times (R/Rmax),$$

where, Na: the predetermined number of conversion steps, Nt: a number of signal steps, acquired by the digital image data processing section, R: a predetermined conversion range established in advance for the analogue-to-digital converting section, Rmax: a maximum amplitude of the analogue image signal inputted from the image capturing element.

(3) The apparatus of item 1, wherein the image capturing element is a line sensor in which a plurality of optical black pixels and effective pixels are arrayed in a line; and wherein the sample-and-hold section samples and holds an image signal level of the plurality of optical black pixels as the black signal level, or a field through level, which appears during a field through period of the analogue image signal for every pixel, as the black signal level.

(4) The apparatus of item 1, wherein the image capturing element is an area sensor in which a plurality of optical black pixels and effective pixels are two-dimensionally arranged in an image area; and wherein the sample-and-hold section samples and holds an image signal level of the plurality of optical black pixels as the black signal level, or a field through level, which appears during a field through period of the analogue image signal for every pixel, as the black signal level.

(5) The apparatus of item 1, further comprising: a digital image data processing section to process the digital image data inputted from the digital subtracting section; wherein the digital image data processing section includes: a highlight peak-level detecting section to detect and hold a highlight peak level included in the digital image data outputted by the digital subtracting section; a black level detecting section to detect and hold the black signal level included in the digital image data outputted by the digital subtracting section; a target-highlight peak-level supplying section to supply a target-highlight peak-level to be established for the digital image data outputted by the digital subtracting section; a target black-level supplying section to supply a target black-level to be established for the digital image data outputted by the digital subtracting section; a correction-value calculating section to calculate correction values, which are employed for adjusting the black signal level included in the digital image data outputted by the digital subtracting section and for amplifying the digital image data, based on the highlight peak level detected by the highlight peak-level detecting section, the black signal level detected by the black level detecting section, the target-highlight peak-level supplied by the target-highlight peak-level supplying section and the target black-level supplied by the target black-level supplying section; and a digital arithmetic section to adjust the black signal level included in the digital image data outputted by the digital subtracting section and to amplify the digital image data, based on the correction values calculated by the correction-value calculating section.

(6) The apparatus of item 5, wherein the correction values calculated by the correction-value calculating section include a multiplying value, based on which the digital image data outputted by the digital subtracting section are amplified, and a subtracting value, based on which a black signal level of digital image data amplified according to the multiplying value is adjusted.

(7) The apparatus of item 6, wherein the multiplying value is calculated by employing the equation of $$Dpx=(Dpr-Dbr)/(Dip-Dib)$$

where Dpx: the multiplying value, Dip: the highlight peak level detected by the highlight peak-level detecting section, Dib: the black signal level detected by the black level detecting section, Dpr: the target-highlight peak-level supplied by the target-highlight peak-level supplying section, Dbr: the target black-level supplied by the target black-level supplying section.

(8) The apparatus of item 7, wherein the subtracting value is calculated by employing the equation of $$Dbx=Dib \times Dpx-Dbr$$

where Dbx: the subtracting value.

According to the present invention described in the above, the following effects can be attained.

1) Since the signal processing unit is equipped with a sample-and-hold means that samples and holds the black level and image signal level of an analog image signal inputted from an imaging device, an A/D conversion means that has been preset to a specified number of conversion steps and within a conversion range greater than the differential between the black level and image signal level sample-and-hold values of the analog image signal sampled and held by the sample-and-hold means, and a digital subtraction means that subtracts the digital image signal of the black level sample-and-hold value and digital image signal of the image signal level sample-and-hold value outputted from the A/D conversion means, the circuit for processing the image signal outputted from the imaging device can be digitalized and hence can be integrated easily. Accordingly, a signal processing unit that is less expensive, resistive against noise, and provides improved signal quality can be realized.

2) Because the number of conversion steps Na of the A/D conversion means is determined according to an expression $Na \geq Nt \times (R/R_{max})$, where Nt is the number of signal steps required by the digital signal processing means, R is the preset conversion range, and $R_{max}$ is the maximum amplitude of the inputted analog image signal, digital data in desired accuracy can be obtained without lowering the number of conversion steps even if the amplitude of the analog image signal outputted from the imaging device is low.

3) Imaging device is a line sensor including multiple optical black pixels and effective pixels (hereinafter, a term of "pixel" is also referred to as "picture element") arranged in a line, and so the sampling means, sampling and holding the image signal level of the optical black picture element as black level, can sense the black level based on the image signal level of the optical black picture element.

4) Imaging device is an area sensor comprising multiple picture elements arranged laterally and longitudinally, and so the sampling means, sampling and holding the field-through level in the field-through time of the analog image signal outputted for every picture element as black level, can sense the black level based on the field-through level.

5) Since the signal processing unit is equipped with a highlight peak level sensing means that senses and retains the highlight peak level of the digital image signal outputted from the digital subtraction means, black level sensing means that senses and retains the black level of the digital image signal outputted from the digital subtraction means, target highlight peak level supply means that supplies a target highlight peak level to be set to the digital image signal outputted from the digital subtraction means, target black level supply means that supplies a target black level to be set to the digital image signal outputted from the digital subtraction means, correction variable calculation means that calculates a correction variable for adjusting and amplifying the black level of the digital image signal outputted from the digital subtraction means based on the black level sensed by the black level sensing means, highlight peak level sensed by the highlight peak level sensing means, target black level supplied from the target black level supply means, and target highlight peak level supplied from the target highlight peak level supply means, and digital operation means that adjusts and amplifies the black level of the digital image signal outputted from the digital subtraction means based on the correction variable calculated by the correction variable calculation means, clamping and amplification processing can be digitalized based on the calculated correction variable. Accordingly, a high-speed signal processing unit with improved resistivity against noise can be realized.

6) Since the correction variable calculated by the correction variable calculation means contains a multiplicative value for amplifying the digital image signal outputted from the digital subtraction means and also a subtractive value for adjusting the black level of the digital image signal amplified by the multiplication, the clamping and signal amplification processing can be digitalized easily based on the multiplicative and subtractive values.

7) Since the multiplicative value Dpx is determined according to an expression Dpx=(Dpr−Dbr)/(Dip−Dib), where Dip is the highlight peak level sensed by the highlight peak level sensing means, Dib is the black level sensed by the black level sensing means, Dpr is the target highlight peak level supplied from the target peak level supply means, and Dbr is the target black level supplied by the target black level supply means, the multiplicative value Dpx can be calculated easily.

8) Since the subtractive value Dbx is determined according to an expression Dbx=Dib×Dpx−Dbr, where Dib is the black level sensed by the black level sensing means, Dbr is the target black level supplied by the target black level supply means, and Dpx is the multiplicative value, the subtractive value Dbx can be calculated easily.

BRIEF DESCRIPTION OF THE DARWINGS

Other objects and advantages of the present invention will become apparent upon reading the following detailed description and upon reference to the drawings in which:

FIG. 5 shows a block diagram of a conventional analog signal processing section 500a;

FIG. 6 shows a conceptual diagram of A/D conversion by a conventional A/D conversion section 520a;

FIG. 11 shows a block diagram of the control of the correction variable setting and control section 610a;

DETAILED DESCRIPTION OF THE PREFERRED EMBODIMENT

Embodiments of the present invention are described hereunder in detail, using figures.

Apparatuses to which the present invention is applicable include photographing apparatus such as digital camera and image reading apparatus such as scanner, digital copying machine and multi-function machine, all of which obtains an optical image using an imaging device.

Embodiment 1

In the embodiment 1, an image reader to which the image processing unit of the present invention applies is explained.

To begin with, the construction is described hereunder.

Figure 1:
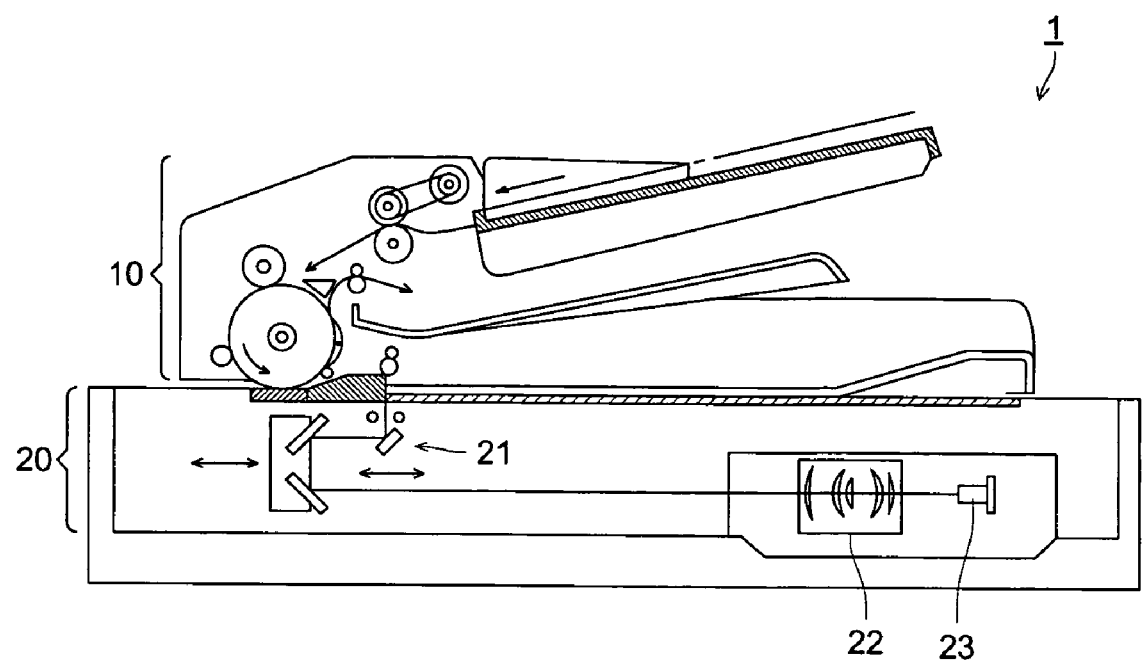
FIG. 1 shows a brief construction of the image reader 1 according to the embodiment 1.

FIG. 1 shows a brief construction of the image reader 1 according to the embodiment 1.

As shown in FIG. 1, the image reader 1 is equipped with a document transfer section 10 and image reading section 20.

The document transfer section 10 transfers every sheet of multiple documents to the image reading section 20.

The image reading section 20, installed under the contact glass on which a document containing an original image transferred from the document transfer section 10 is placed, reads the image of the document. The image reading section 20 comprises a light source such as lamp for lighting the document, optical system 21 comprising multiple mirrors, lens 22 for collecting the reflection light from the original image, CCD (charge coupled device) line sensor 23 as an imaging device, drive section comprising a drive motor and others (not shown), and white reference board for sensing the highlight peak level. The image on the document is read as the light irradiated from the lamp is scanned on the document and the reflection light formed into an image is converted photo-electrically, and the read analog image signal is subjected to analog signal processing and converted to a digital image signal, which is then outputted to a digital signal processor. The image above includes not only image data such as graphics and photos but also text data such as characters and symbols.

Figure 2:
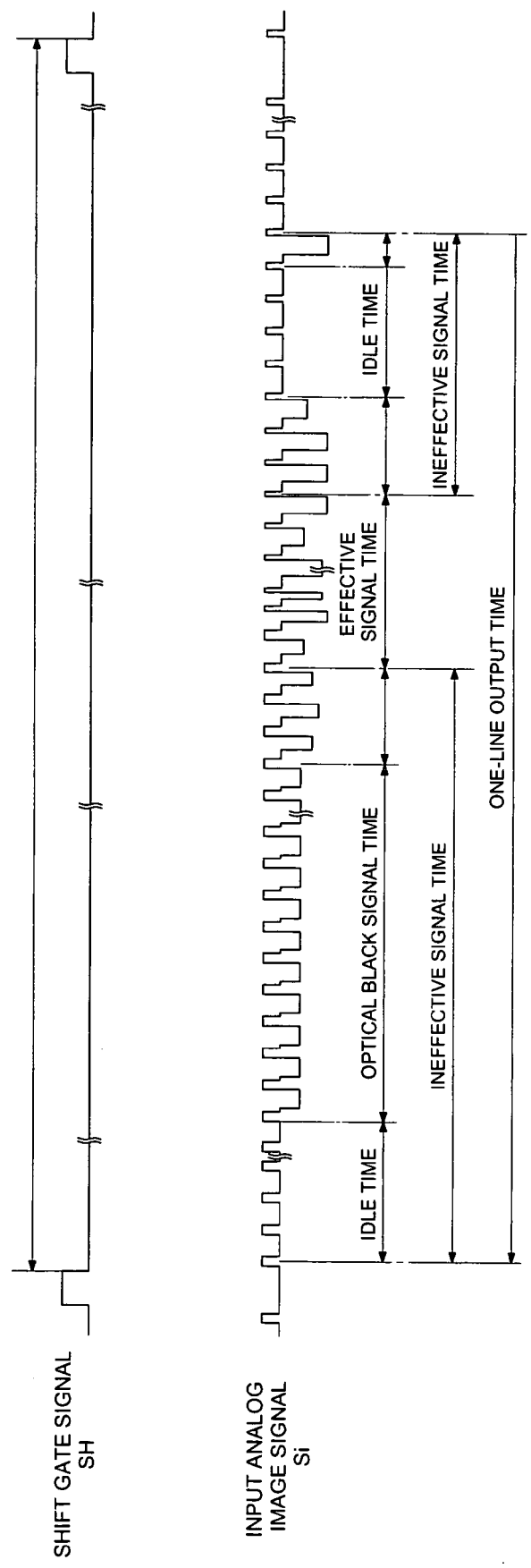
FIG. 2 shows a timing chart of the analog image signal in one horizontal scan outputted from the CCD line sensor 23.

FIG. 2 is a timing chart of the analog image signal in one horizontal scan outputted from the CCD line sensor 23.

The CCD line sensor 23, comprising multiple imaging devices (hereinafter called the picture element) arranged in lines in the horizontal scan direction of the document, reads image data by every horizontal scan of the original image and separates the input analog signal of the image data in one horizontal scan into an even and odd image signals for output. The figure shows the odd part of the input analog image signal. The even and odd parts of the input analog image signal outputted from the CCD line sensor 23 are subjected to signal processing respectively in an analog signal processor (which will be explained later) and then composed together into one piece of image data in the digital signal processor in the next stage.

The input analog image signal Si contains one-line output time, which is a sequence of an idle time, optical black signal time, effective signal time representing the actual image data, and another idle time, in one cycle of the shift gate signal SH. The optical black signal time is a signal time outputted from the optical black picture element that is optically shaded by covering the multiple picture elements provided at the end of the CCD line sensor 23 with shield material such as aluminum foil. The effective signal time is a signal time outputted from multiple effective picture elements that output the actual image data. The time including the idle time and optical black signal time is called the ineffective signal time as compared to the effective signal time.

Since the even part of the input analog image data is the same as the odd part of the input analog image data, no further description is given.

Figure 3:
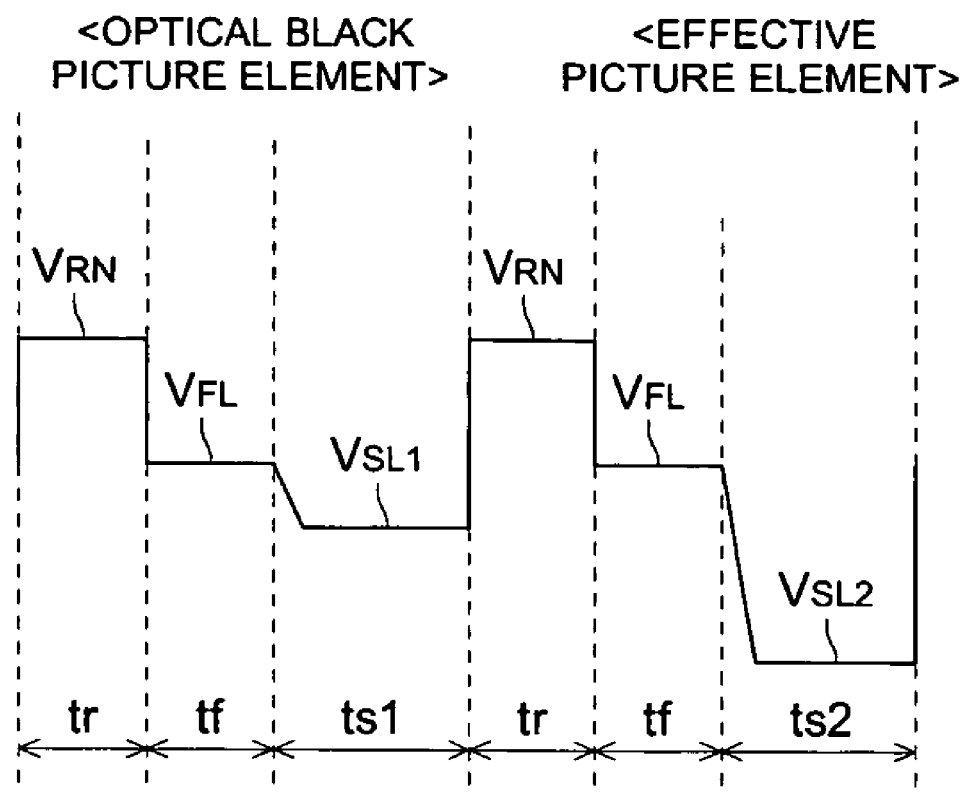
FIG. 3 shows an example of analog image signal outputted from the optical black picture element and effective picture element of the CCD line sensor 23.

FIG. 3 is an example of analog image signal outputted from the optical black picture element and effective picture element of the CCD line sensor 23.

An analog image signal outputted from the optical black picture element and effective picture element contains a reset time tr, field-through time tf, and image signal time ts.

The reset time tr is a signal time in which a reset noise $V_{RN}$ is caused after a reset pulse for recognizing the picture element is inputted. The image signal time ts is a time in which an image signal level $V_{SL}$ of the optical black picture element or effective picture element is outputted. By sampling the image signal level $V_{SL1}$ of the image signal time ts1 of the optical black picture element, black level can be sensed. In addition, by sampling the image signal level $V_{SL2}$ of the image signal time ts2 of the effective picture element, image signal can be sensed.

Figure 4:
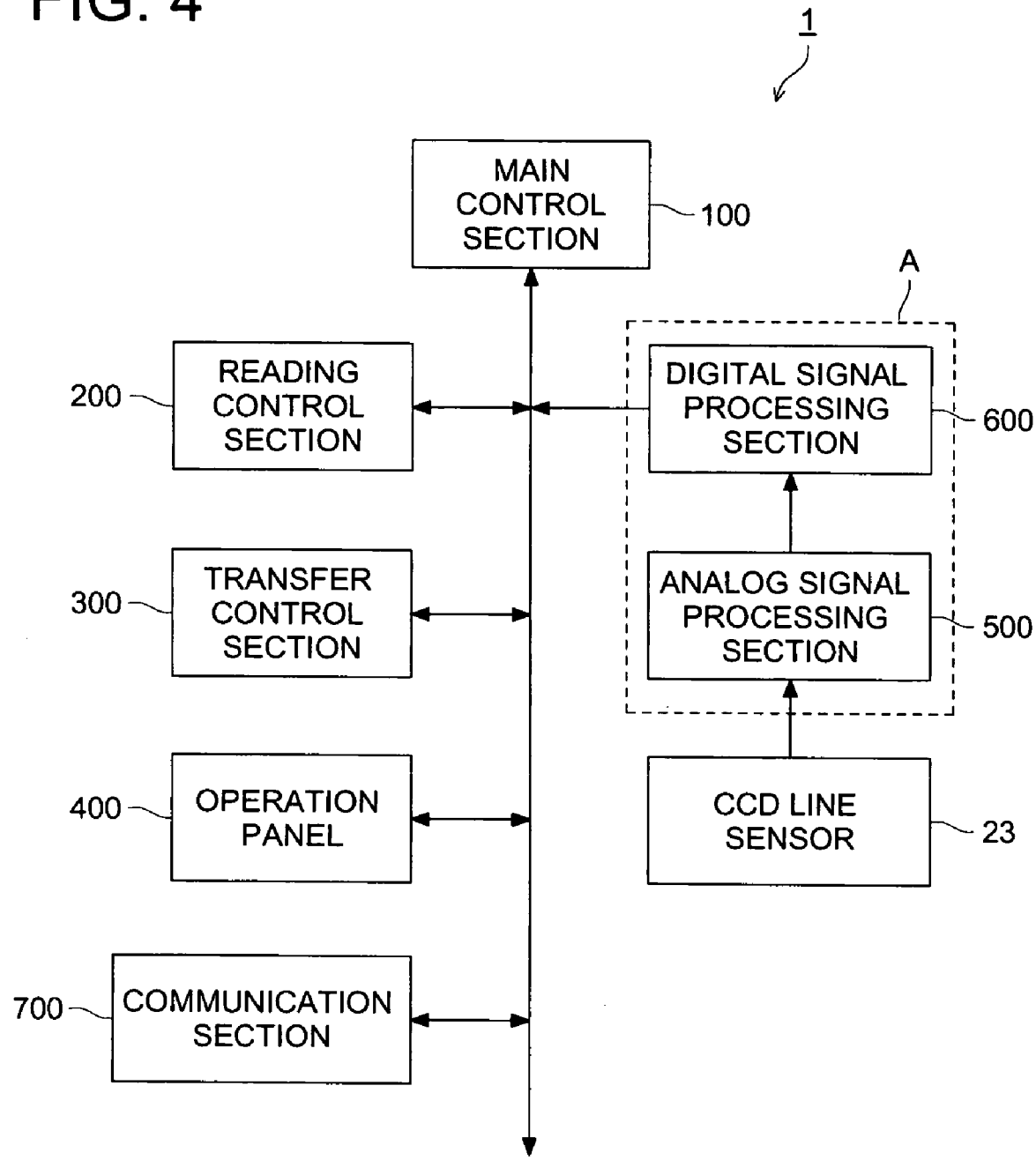
FIG. 4 shows a block diagram of the control of the image reader 1.

FIG. 4 is a block diagram of the control of the image reader 1.

As shown in FIG. 4, the image reader 1 comprises a main control section 100, reading control section 200, transfer control section 300, operation panel 400, signal processing unit A serving as the signal processing unit, and communication section 700.

The main control section 100 comprises a CPU (central processing unit), ROM (read only memory), and RAM (random access memory), where the CPU reads out system programs, individual processing program and data stored in the ROM and develops them in the RAM, and controls the operation of each part of the image reader 1 centrally according to the developed programs. The CPU also performs the timing control of the whole system, input/output control of the operation panel 400, recording and storage control of the image data using the RAM, operation control of the interface (I/F) with other applications (FAX, printer, scanner, etc.).

The reading control section 200 comprises a CPU, ROM and RAM, where the CPU reads out system programs, individual processing program and data stored in the ROM and develops them in the RAM, and controls the operation of each part of the image reading section 20 according to the developed programs. In reading the document, the CPU also performs the on/off control of the light source, motion control of the optical system 21 comprising multiple mirrors, and drive control of the CCD line sensor 23.

The transfer control section 300 comprises a CPU, ROM and RAM, where the CPU reads out system programs, individual processing program and data stored in the ROM and develops them in the RAM, and controls the operation of each part of the document transfer section 10 according to the developed programs. In reading the document, the CPU also senses the document size and controls the drive motor of the document transfer roller.

The operating panel 400 is equipped with a power switch, numeric keys and various function keys, and touch panel. When any of these is pressed, an activation signal is outputted to the main control section 100.

The signal processing unit A consists of an analog signal processing section 500 and digital signal processing section 600. The analog signal processing section 500 processes an electric signal outputted from the CCD line sensor 23 as analog image signal to convert the signal analog-to-digital, and then outputs it to the digital signal processing section 600. The digital signal processing section 600 processes the digital image signal that has been digitalized in the analog signal processing section 500, and output the signal to the main control section 100.

The communication section 700, comprising a model, TA (terminal adaptor) and router, controls the communication with external devices connected with a network. For example, the image data read by the image reading section 20 can be transmitted to an external device via the communication section 700.

To begin with, a conventional analog signal processing section 500a is described hereunder.

Figure 5:
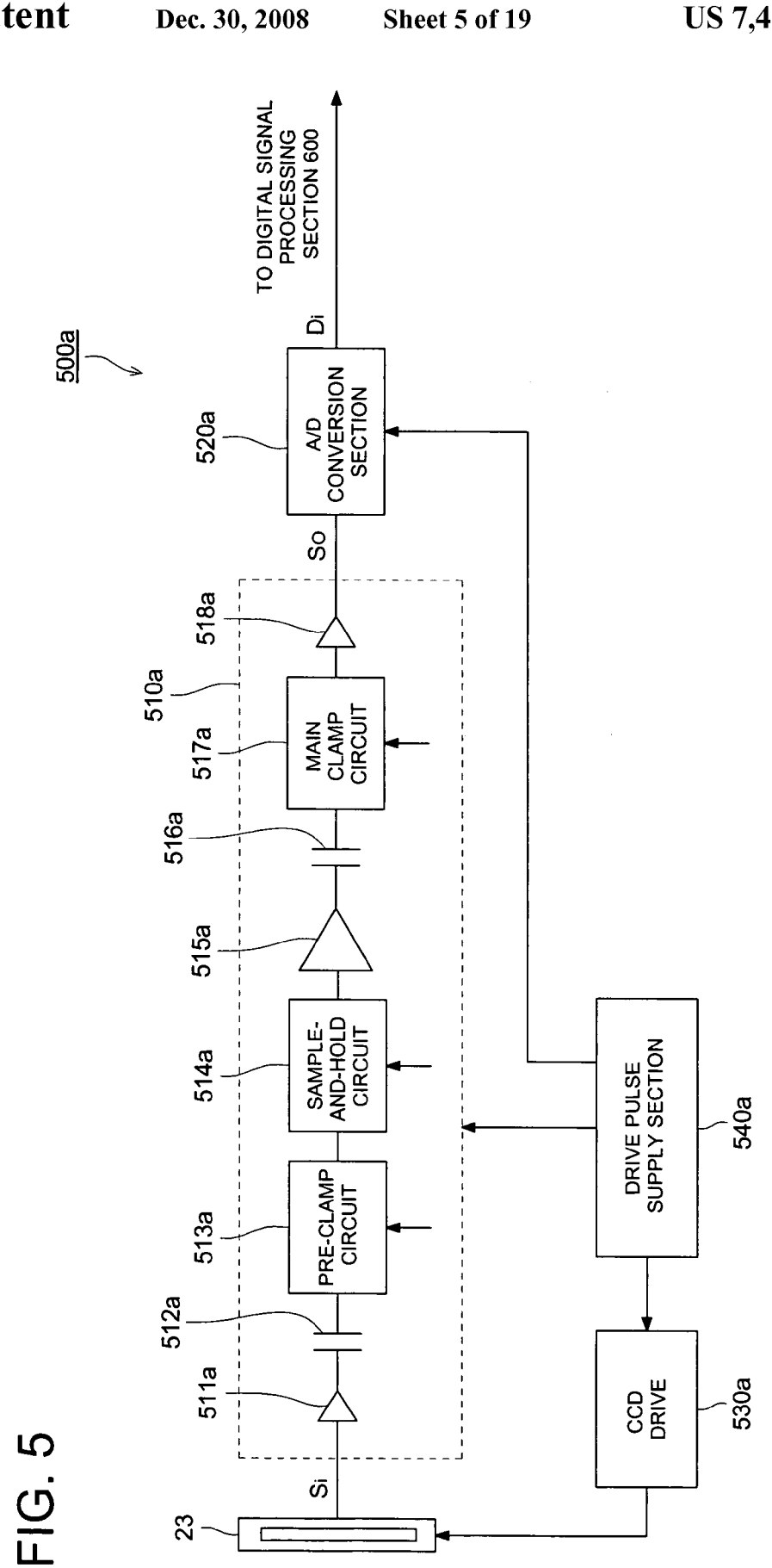

FIG. 5 is the block diagram of a conventional analog signal processing section 500a.

As shown in FIG. 5, the analog signal processing section 500a comprises a signal processing section 510a, A/D conversion section 520a, CCD drive 530a, and drive pulse supply section 540a.

The signal processing section 510a comprises a buffer 511a, AC coupled capacitor 512a, pre-clamp circuit 513a, sample-and-hold circuit 514a as the sample-and-hold means, VCA (voltage controlled amplifier) circuit 515a, AC coupled capacitor 516a, main clamp circuit 517a, and buffer 518a.

The analog image signal inputted from the CCD line sensor 23 to the signal processing section 510a (hereinafter called the input analog image signal Si) is inputted to the AC coupled capacitor 512a via the buffer 511a.

The AC coupled capacitor 512a cuts off the direct-current component of the input analog image signal Si and constitutes a clamp circuit together with the pre-clamp circuit 513a. The pre-clamp circuit 513a performs clamping of the input analog image signal Si by adding a preset direct-current potential as a reference value of the black level (direct-current regeneration) so as to adjust the black level. The reference value of the black level is an average of the image signal levels in the optical black signal time. The input analog image signal Si after being clamped is outputted to the sample-and-hold circuit 514a.

The sample-and-hold circuit 514a samples and holds the black level and image signal level of the input analog image signal Si inputted from the pre-clamp circuit 513a and outputs the signal to the VCA circuit 515a. In the case of the CCD line sensor 23, the sample-and-hold circuit 514a samples and holds the image signal level of the optical black picture element as the black level.

The VCA circuit 515a amplifies the input analog image signal Si, from which an image signal level has been extracted, so as to fall under the conversion range, and outputs the signal to the main clamp circuit 517a including the AC coupled capacitor 516a.

The AC coupled capacitor 516a cuts off the direct-current component of the amplified input analog image signal Si again and constitutes a clamp circuit together with the main clamp circuit 517a. The main clamp circuit 517a performs clamping of the input analog image signal Si again so as to adjust the black level again. Then, it outputs the signal to the A/D conversion section 520a via the buffer 518a as the output analog image signal So.

The A/D conversion section 520a converts analog-to-digital the output analog image signal So inputted from the signal processing section 510a, and then outputs an input digital image signal Di to be inputted into the digital signal processing section 600 in the next stage.

Figure 6:
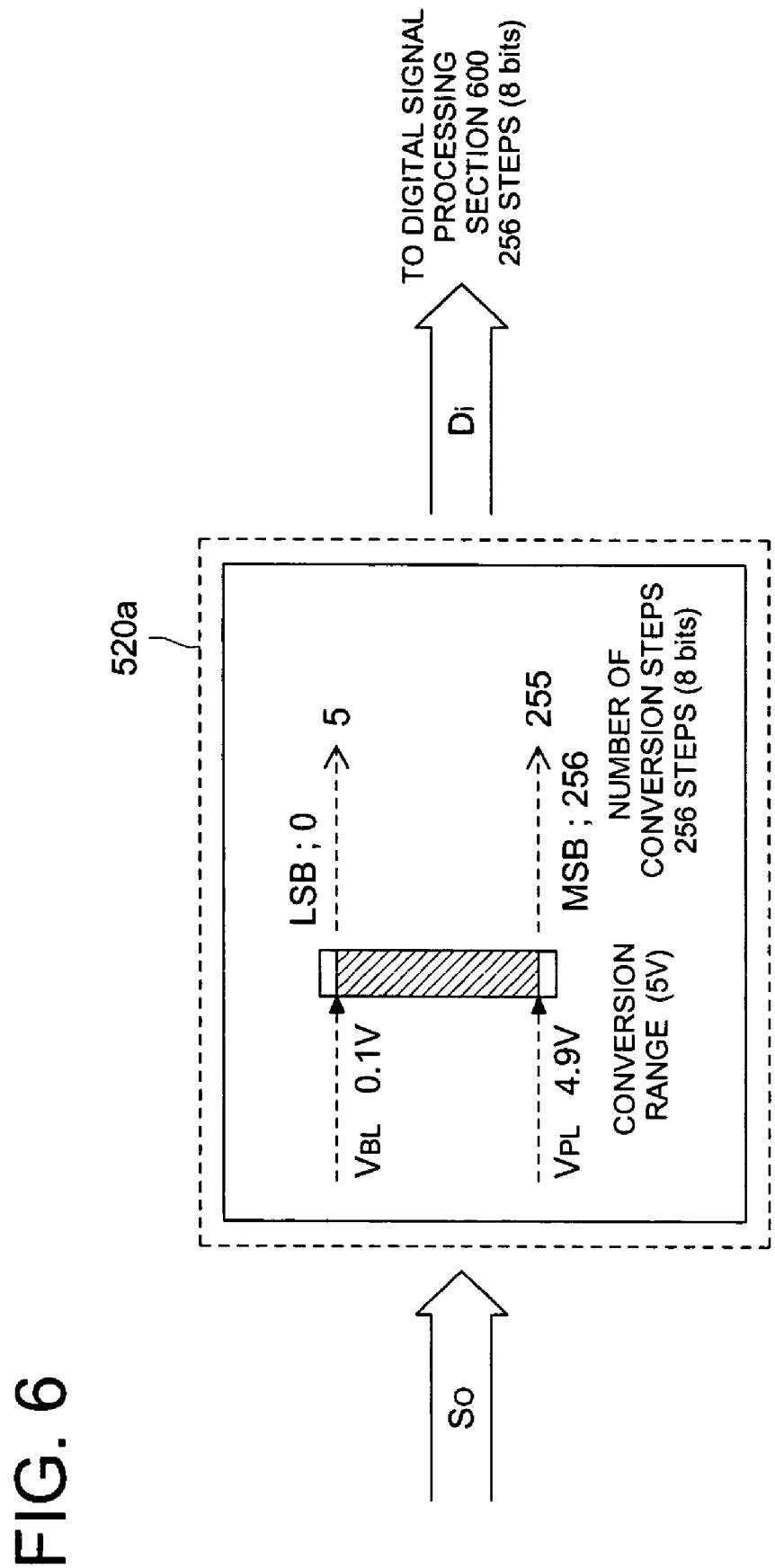

FIG. 6 is a conceptual diagram of A/D conversion by a conventional A/D conversion section 520a.

As shown in FIG. 6, an output analog image signal So of which black level is adjusted and amplified so that the highlight peak level $V_{PL}$ falls near the maximum and black level $V_{BL}$ falls near the minimum is inputted to a conventional A/D conversion section 520a so as to utilize the conversion range effectively. The output analog image signal So inputted to the A/D conversion section 520a is converted, for example, into an output digital image signal Di of which highlight peak level $V_{PL}$ is near the most significant bit MSB and black level $V_{BL}$ is near the least significant bit LSB.

For example, in the case of an A/D conversion section 520a of which conversion range is 0V to 5V and number of conversion steps is 8 bits, an output analog image signal So of which black level is adjusted and amplified so that the highlight peak level $V_{HL}$ (4.9V) is near the maximum (5V) of the conversion range and black level $V_{BL}$ (0.1V) is near the minimum (0V) is inputted. The output analog image signal So inputted to the A/D conversion section 520a is converted into an input digital image signal Di of which highlight peak level $V_{HL}$ is 255 near the most significant bit MSB (256) and black level $V_{BL}$ is 5 near the least significant bit LSB (0).

The CCD drive 530a, outputting a timing pulse according to the control signal outputted from the drive pulse supply section 540a, controls the drive of the CCD line sensor 23.

The drive pulse supply section 540a outputs a drive pulse according to the control signal outputted from the main control section 100 and controls the drive of the CCD-line sensor 23, signal processing section 510a and A/D conversion section 520a.

In the prior arts, since the clamp processing for direct-current regeneration of a signal by cutting off a direct-current component and then adding a specified direct-current potential so as to stabilize the black level, sample-and-hold processing for sensing the image signal level, and signal amplification processing for matching the signal with the conversion range are all analog signal processing, waveform is distorted due to the effect of noise incoming during the processing and hence there arises a problem that accurate data cannot be transmitted.

Next, the analog signal processing section 500b of the embodiment 1 is described hereunder.

Figure 7:
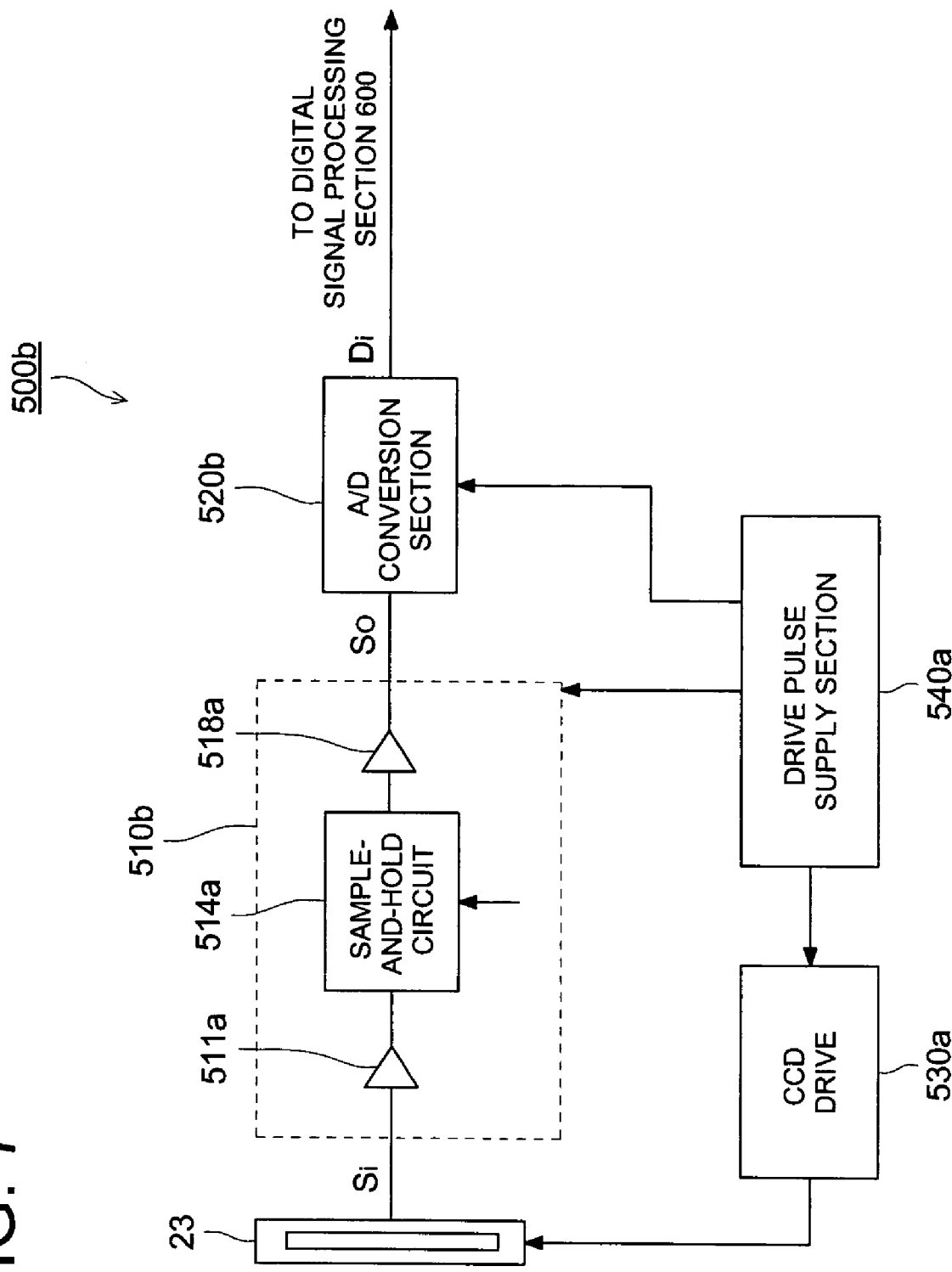
FIG. 7 shows a block diagram of the analog signal processing section 500b to which the embodiment 1 applies.

FIG. 7 is the block diagram of the analog signal processing section 500b to which the embodiment 1 applies.

As shown in FIG. 7, the analog signal processing section 500b comprises a signal processing section 510b, A/D conversion section 520b, CCD drive 530a, and drive pulse supply section 540a.

In describing the construction of the analog signal processing section 500b of the embodiment 1, the same part as for the conventional one is given the same symbol and further explanation is omitted. Only the different functions from the conventional one are described hereunder. To be concrete, the black level adjustment and signal amplification performed by clamp processing in the AC coupled capacitor 512a, pre-clamp circuit 513a, VCA circuit 515a, AC coupled capacitor 516a, and main clamp circuit 517a of the conventional signal processing section 510a have been omitted in the construction because it is performed in the digital signal processing section 600 after A/D conversion.

Figure 8:
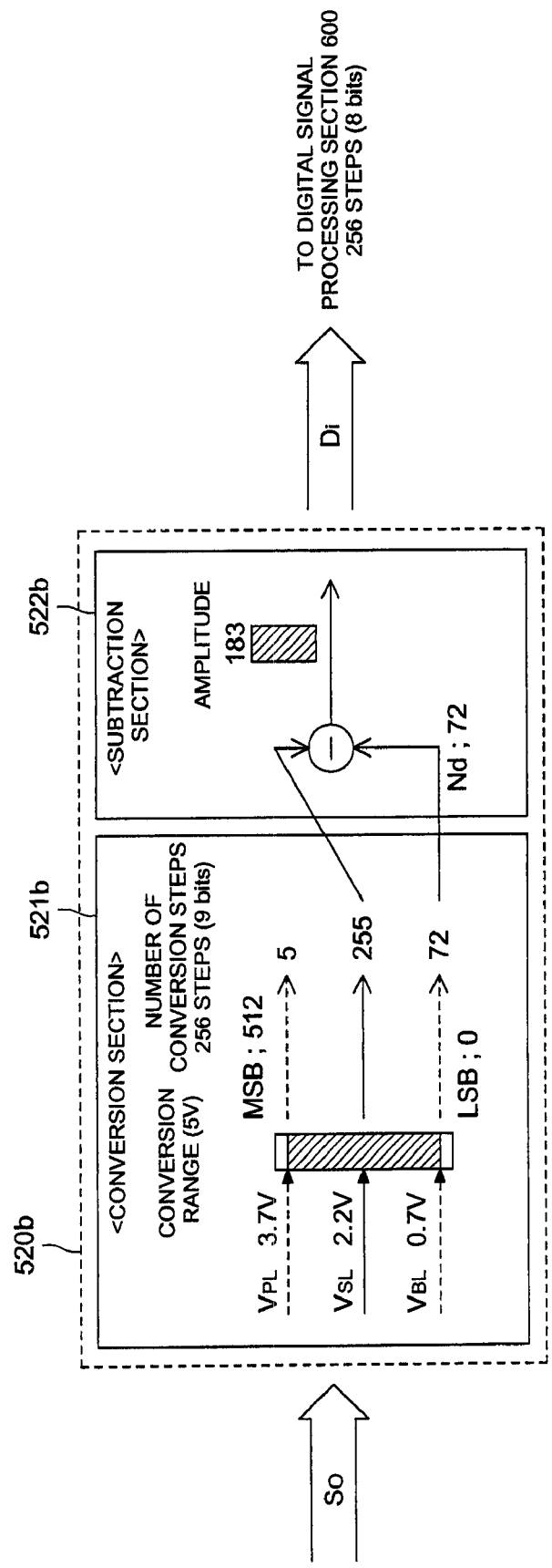
FIG. 8 shows a conceptual diagram of A/D conversion by the A/D conversion section 520b of the embodiment 1.

FIG. 8 is a conceptual diagram of A/D conversion by the A/D conversion section 520b of this embodiment 1.

As shown in FIG. 8, the A/D conversion section 520b of this embodiment 1 is equipped with a conversion section 521b as the A/D conversion means and digital subtraction section 522b as the digital subtraction means.

The conversion range of the conversion section 521b is greater than the differential between the black level and image signal level sample-and-hold values which respectively are the sampled and held black level and image signal level of the input analog image signal Si. This conversion level has been set to an allowable range from the "black level $V_{BL}$ containing a direct-current component" to the "highlight peak level $V_{PL}$ containing a direct-current component" at the design stage of the A/D conversion section 520b.

The "highlight peak level $V_{PL}$ containing a direct-current component" is the maximum of image data that is obtained by taking an image of a white reference board of which spectral characteristic is uniform under a visual light differently from the contact glass where a document is placed and of which reflection factor is higher than normal document. It is obtained as the image signal of the effective picture elements obtained by taking an image of the white reference board is subjected to shading compensation and the image signal of a single scan is peak-held. In order to remove noise, an average of the peak-hold levels of multiple lines is regarded as the "highlight peak level $V_{PL}$ containing a direct-current component".

The "black level $V_{BL}$ containing a direct-current component" is an average of multiple image signals of optical black picture elements.

The conversion range of the A/D conversion section 520b has been set wide enough so as not to exceed the range from the "black level $V_{BL}$ containing a direct-current component" to the "highlight peak level $V_{PL}$ containing a direct-current component", including the dispersion thereof, that is obtained by taking an image of the white reference board experimentally at the design stage of the circuit.

The number of conversion steps Na of the conversion section 521b is determined according to the expression (1) below based on the number of signal steps Nt required in the digital signal processing section 600 in the next stage, conversion range R preset at the design stage of the A/D conversion section 520b, and maximum amplitude $R_{max1}$ of the output analog image signal So calculated from the difference between the highlight peak level $V_{PL}$ and black peak level $V_{BL}$ obtained at the design stage.

$$Na \geq Nt \times (R/R_{max1}) \qquad \text{Expression (1)}$$

For example, if the number of signal steps Nt is 256 (8 bits), conversion range is 5V, and maximum amplitude $R_{max1}$ is 3V, the necessary number of conversion steps Na calculated from the expression (1) turns to be about 1.7 times or more of 256 (8 bits). Accordingly, the number of conversion steps Na is set to 436 or more, and the number of bits for the A/D conversion is set to 9 bits.

Since the number of conversion steps Na is calculated according to the expression (1), digital data in desired accuracy can be obtained in the digital signal processing section 600 in the next stage without lowering the number of signal steps even if the amplitude of the input analog image signal Si outputted from the CCD line sensor 23 is low.

The digital subtraction section 522b subtracts the digital image signal of the black level sample-and-hold value and digital image signal of the image signal level sample-and-hold value outputted from the conversion section 521b, and calculates the amplitude of the output analog image signal So.

For the CCD line sensor 23, a digital value of the black level $V_{BL}$ containing a direct-current component obtained at the design stage of the A/D conversion section 520b (hereinafter called the digital subtractive value Nd) is set as the black level sample-and-hold value.

When a document is being scanned and read, the digital subtraction section 522b subtracts the preset digital subtractive value Nd from the digital value of every picture element of the output analog image signal So converted in the conversion section 521b, and calculates the amplitude of the output analog image signal So. The calculated amplitude is then outputted to the digital signal processing section 600 as the input digital image signal Di.

For example, when a document is being scanned and read, if the conversion range is 5V and the number of conversion steps Na is 512 (9 bits) in the conversion section 521b, and the digital subtractive value Nd of the digital subtraction section 522b is 72, the output analog image signal So with the image signal level of 2.2V is converted to a digital value of 225 in the conversion section 521b. Then, the digital subtractive value Nd (72) is subtracted from the digital value (225) and the signal amplitude of 183 is calculated. The calculated signal amplitude (183) is outputted as the input digital image signal Di.

That is to say, by specifying the conversion range, number of conversion steps and digital subtractive value Nd at the design stage of the A/D conversion section 520b, assuming the output analog image signal So to be inputted, a signal processing unit that can improve the noise resistance of the image data obtained from the CCD line sensor 23 and transmit the image data accurately can be realized.

Figure 9:
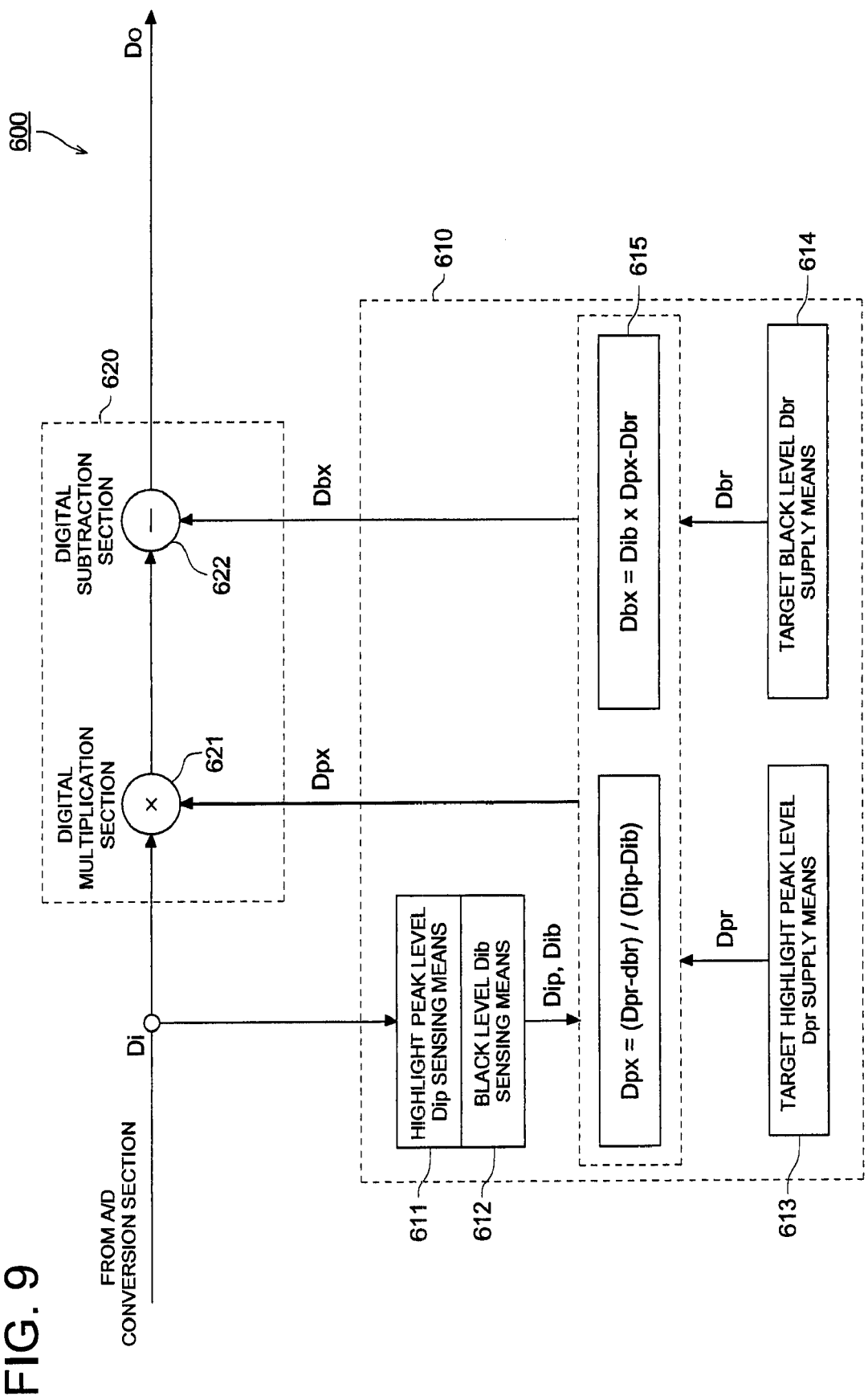
FIG. 9 shows a conceptual diagram of digital signal processing by the digital signal processing section 600 of the embodiment 1.

FIG. 9 is a conceptual diagram of digital signal processing by the digital signal processing section 600 of the embodiment 1.

As shown in FIG. 9, the digital signal processing section 600 of the embodiment 1 is equipped with a correction variable calculation means 610 and digital operation means 620.

The correction variable calculation means 610 comprises a highlight peak level sensing means 611 that senses the highlight peak level Dip of the input digital image signal Di outputted from the digital subtraction section 522b, black level sensing means 612 that senses the black level Dib of the input digital image signal Di outputted from the digital subtraction section 522b, target highlight peak level supply means 613 that supplies a target highlight peak level Dpr as the target of the highlight peak level, target black level supply means 614 that supplies a target black level Dbr as the target of the black level, and correction variable calculation means 615 that calculates a multiplicative value Dpx and subtractive value Dbx used for adjusting (that is, clamping) and amplifying the black level of the input digital image signal Di inputted from the A/D conversion section 520b based on the highlight peak level Dip sensed by the highlight peak level sensing means 611, black level Dib sensed by the black level sensing means 612, target highlight peak level Dpr supplied from the target highlight peak level supply means 613, and target black level Dbr supplied from the target black level supply means 614.

The digital operation means 620 adjusts and amplifies the black level of the input digital image signal Di outputted from the digital subtraction section 522b based on the multiplicative value Dpx and subtractive value Dbx calculated by the correction variable calculation means 615.

The multiplicative value Dpx is calculated according to the expression (2) below based on the target highlight peak level Dpr, target black level Dbr, highlight peak level Dip and black level Dib.

$$Dpx=(Dpr-Dbr)/(Dip-Dib) \quad \text{Expression (2)}$$

The subtractive value Dbx is calculated according to the expression (3) below based on the multiplicative value Dpx calculated from the expression (2), black level Dib and target black level Dbr.

$$Dbx=Dib \times Dpx-Dbr \quad \text{Expression (3)}$$

For example, if the target highlight peak level Dpr is set to 254 and target black level Dbr to 5, and the highlight peak level Dip sensed by the highlight peak level sensing means 611 is 128 and black level Dib sensed by the black level sensing means 612 is 10, the multiplicative value Dpx is calculated (to be 2.1) from the expression (2). After the multiplicative value Dpx is calculated, the subtractive value is calculated (to be 16) based on the black level Dib, target black level Dbr, multiplicative value Dpx and the expression (2). When the multiplicative value Dpx (2.1) and subtractive value Dbx (16) are calculated, they are set as the correction variables of the digital operation means 620.

After the multiplicative value Dpx (2.1) and subtractive value Dbx (16) are set to the digital operation means 620, if the same level (10) as the black level is outputted as an image signal level of the digital image signal from the digital subtraction section 522b, it is multiplied by the multiplicative value Dpx (2.1) in the multiplication section 621 of the digital operation means 620 and so the image signal level after the multiplication becomes 21. Then, the subtractive value Dbx (16) is subtracted from it in the subtraction section 622, and the image signal level after the subtraction becomes 5. Accordingly, the image signal level (10) of the digital image signal outputted from the A/D conversion section 520b can be made equal to the target black level (5), and hence the adjustment and amplification of the black level that used to be processed in a conventional image processing section 510a can be digitalized.

As explained above, the multiplicative value Dpx and subtractive value Dbx can be calculated easily using the expression (2) and expression (3), and hence the clamping and amplification for adjusting the black level can be digitalized easily.

Figure 10:
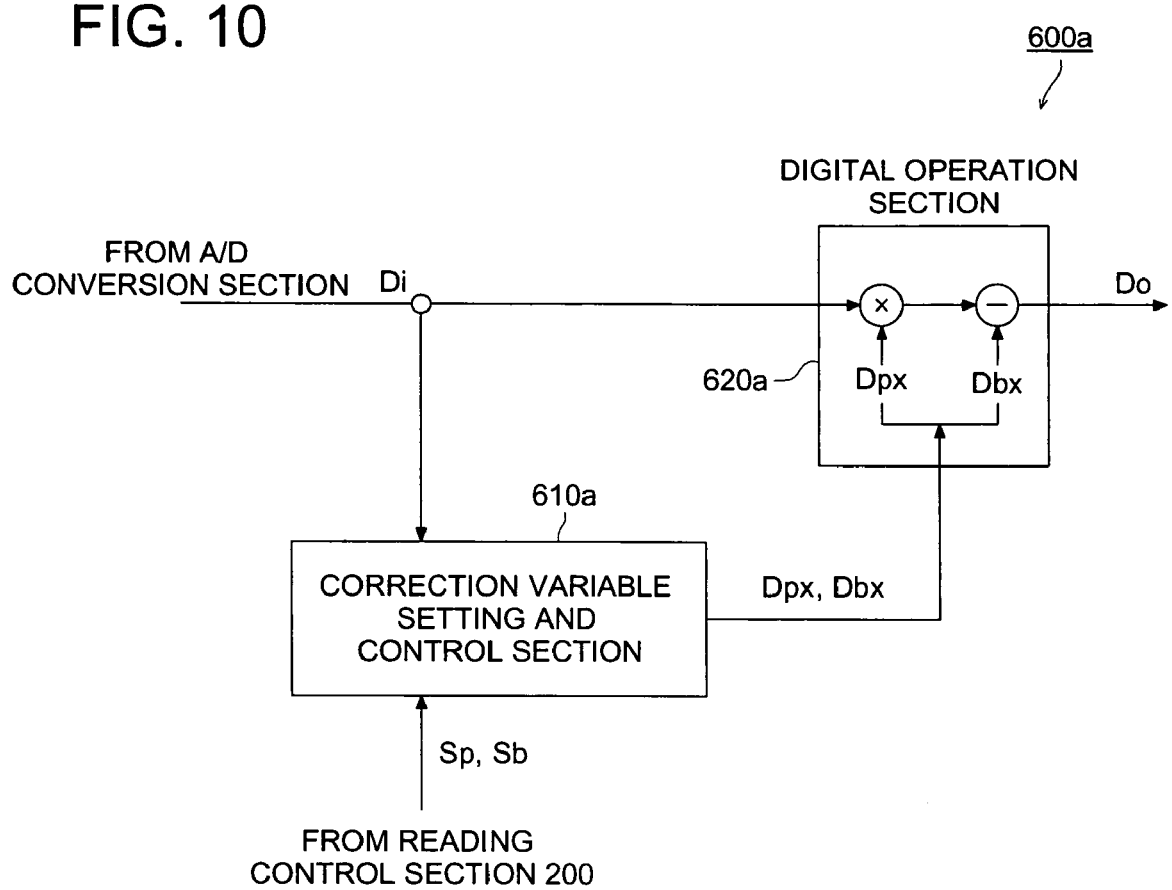
FIG. 10 shows a block diagram of a digital signal processing section 600a that realizes the present invention in the form of software by means of application program.

FIG. 10 is a block diagram of a digital signal processing section 600a that realizes the present invention in the form of software by means of an application program.

As shown in FIG. 10, the digital signal processing section 600a comprises a correction variable setting and control section 610a and digital operation section 620a.

The correction variable setting and control section 610a, which operates in the same manner as the correction variable calculation means 610 in FIG. 9, senses the highlight peak level Dip when a highlight peak level sensing start signal Sp is inputted from the reading control section 200, and senses the black level Dib when a black level sensing start signal Sb is inputted, and then calculates the multiplicative value Dpx and subtractive value Dbx.

The highlight peak level Dip is the maximum of the input digital image signal Di obtained by taking an image of a white reference board, not by scanning a document, and it is obtained by holding the peak of the input digital image signal Di in a single scan. In order to remove noise, an average of the peak-hold levels of multiple lines is regarded as the highlight peak level Dip.

Since sensing the highlight peak level Dip is different from an action of scanning and reading a document, it should not necessary be processed in high speed. Thus, image data on multiple lines of the white reference board are read at a time and stored first, the stored image data on one line is subjected to peak-hold processing after another, and then the peak-hold levels (maximum image signal levels) of multiple lines are averaged.

The black level Dib is an average of multiple optical black picture elements of the input digital image signal Di so as to remove noise.

Since sensing the black level Dib at any time is enabled by the design of the CCD line sensor 23, it can be sensed same time while a document is being scanned and read. Normally, however, it is sensed in the same manner as the highlight peak level Dip separately from an action of scanning and reading a document.

For example, after sensing the highlight peak level Dip is complete, image data on multiple lines are read at a time, with light off, and stored first. Next, the image signal levels of multiple optical black picture elements of the stored image data on one line is averaged after another, and then the averages of the image signal levels of multiple lines are averaged.

Figure 11:
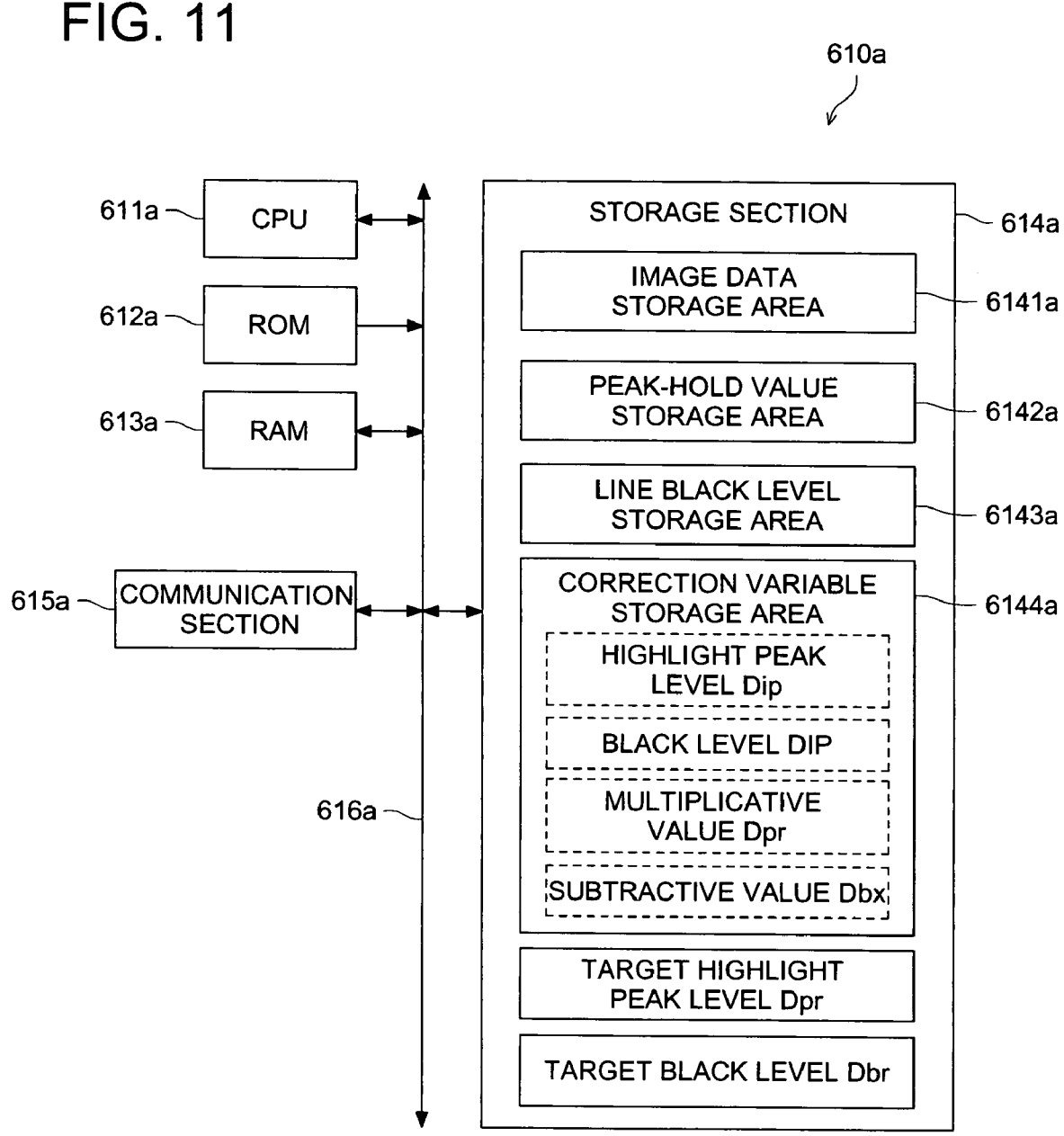

FIG. 11 is a block diagram of the control of the correction variable setting and control section 610a.

As shown in FIG. 11, the correction variable setting and control section 610a comprises a CPU 611a, ROM 612a, RAM 613a, storage section 614a, and communication section 615a, each of which is connected with a bus 616a, a communication means.

The CPU 611a reads out system programs, individual processing program and data stored in the ROM 612a and storage section 614a and develops them in the RAM 613a, and senses the highlight peak level Dip and black level Dib according to the developed programs and then calculates the multiplicative value Dpx and subtractive value Dbx. In addition, the CPU 611a takes charge of the timing control for setting the correction variables, recording and storage control of image data in the storage section 614a, interface (I/F) control with the reading control section 200, and other operation control.

Programs and data relating to the correction variable setting operation have been stored in the ROM 612a. The programs and data stored in the ROM 612a for realizing this embodiment include a program for sensing the highlight peak level Dip that starts operation when a highlight peak level sensing start signal Sp is inputted from the reading section 200, program for sensing the black level Dib that starts operation when a black level sensing start signal Sb is inputted, program for calculating the multiplicative value Dpx and subtractive value Dbx after the highlight peak level Dip and black level Dib have been sensed, expression (2) for calculating the multiplicative value Dpx, and expression (3) for calculating the subtractive value Dbx.

In various processing executed and controlled by the CPU 611a, the RAM 613a serves as a temporary storage for the expressions (2) and (3), inputted and/or outputted data and parameters read by the ROM 612a and/or storage section 614a.

The storage section 614a comprises an image data storage area 6141a, peak-hold value storage area 6142a, line black level storage area 6143a, and correction variable storage area 6144a, and the target highlight peak level Dpr and target black level Dbr are also stored therein.

The image data storage area 6141a is a storage area where the image data read from the CCD line sensor 23 in detecting the highlight peak level Dip and black level Dib is stored.

The peak-hold value storage area 6142a is a storage area where the maximum image level per every line of the image signals on multiple lines stored in the image data storage area 6141a is stored.

The line black level storage area 6143a is a storage area where the average image signal level, which is an average of the image signal levels of preset multiple optical black picture elements of each line of the image signals of multiple lines stored in the image data storage area 6141a, is stored.

The correction variable storage area 6144a is a storage area where the sensed highlight peak level Dip and black level Dib and calculated multiplicative value Dpx and subtractive value Dbx are stored.

The communication section 615a controls the communication of the reading control section 200.

Next, the operation of the embodiment 1 is described hereunder.

Figure 12:
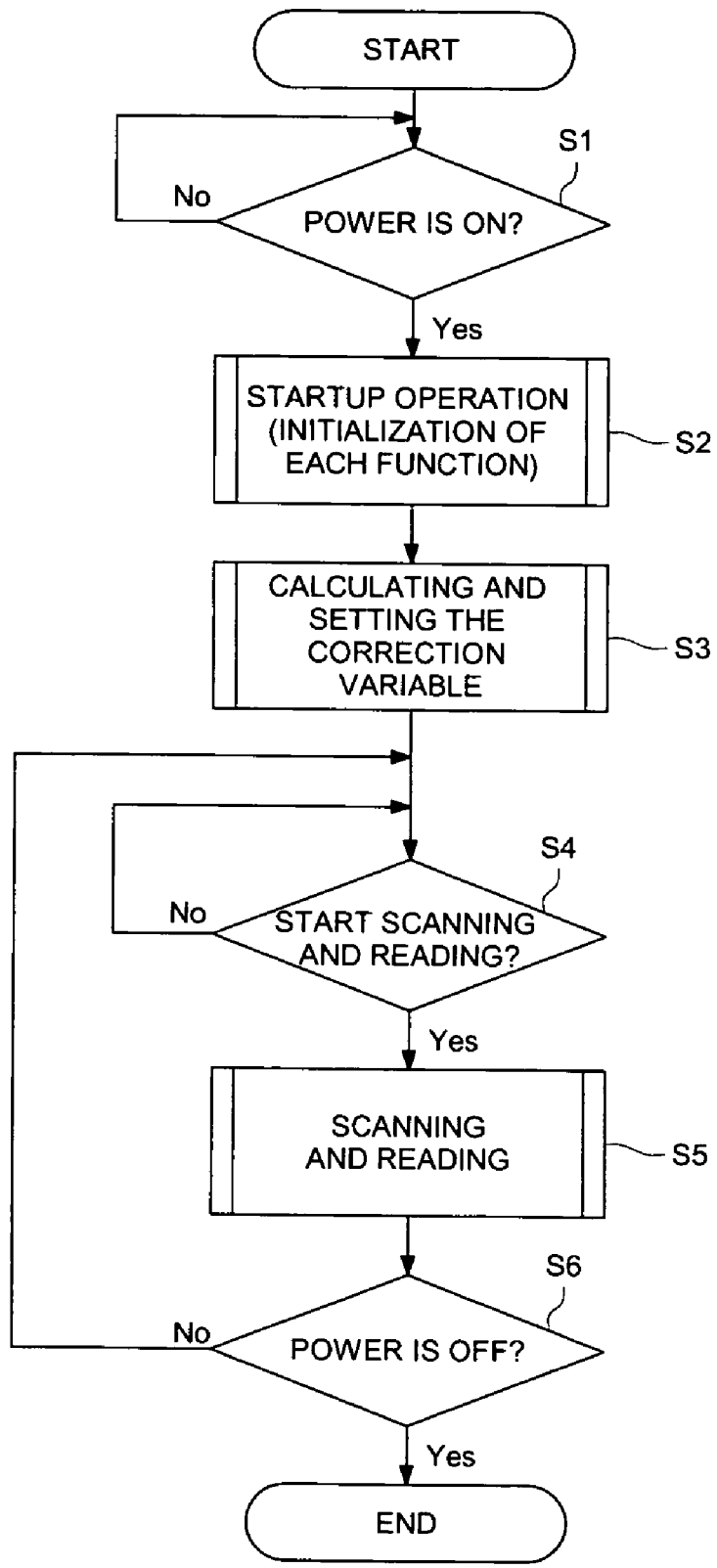
FIG. 12 shows a main flow of the image reader 1 according to this embodiment 1.

FIG. 12 shows a main flow of the image reader 1 according to this embodiment 1.

When the image reader 1 is powered on (step S1: Yes), startup operation of each portion is performed, including the initialization of storage media such as RAM, check of the lamp for lighting document, check of the operation of the optical system 21, and initialization of other functions (step S2).

After the startup operation of each portion is complete, the correction variables (the multiplicative value Dpx and subtractive value Dbx) used for the digital processing in scanning and reading a document are calculated and set (step S3).

After the correction variables are calculated and set, whether to start scanning and reading a document or not is judged (step S4). If scanning and reading a document is not started, for example, if no document has been placed on the document transfer section 10 or glass plate (step S4: No), the machine stands by.

If scanning and reading the document is started, for example, if a document has been placed on the document transfer section 10 or glass plate (step S4: Yes), a scanning and reading operation for converting an optical image obtained by irradiation of light onto the document into an electric signal and obtaining image data is performed (step S5).

After the scanning and reading is complete, whether the power is OFF or not is judged (step S6). If the power has not been turned OFF (step S6: No), whether to start scanning and reading another document or not is judged (return to step S4).

If the power is OFF (step S6: Yes), the operation of the image reader 1 ends.

Figure 13:
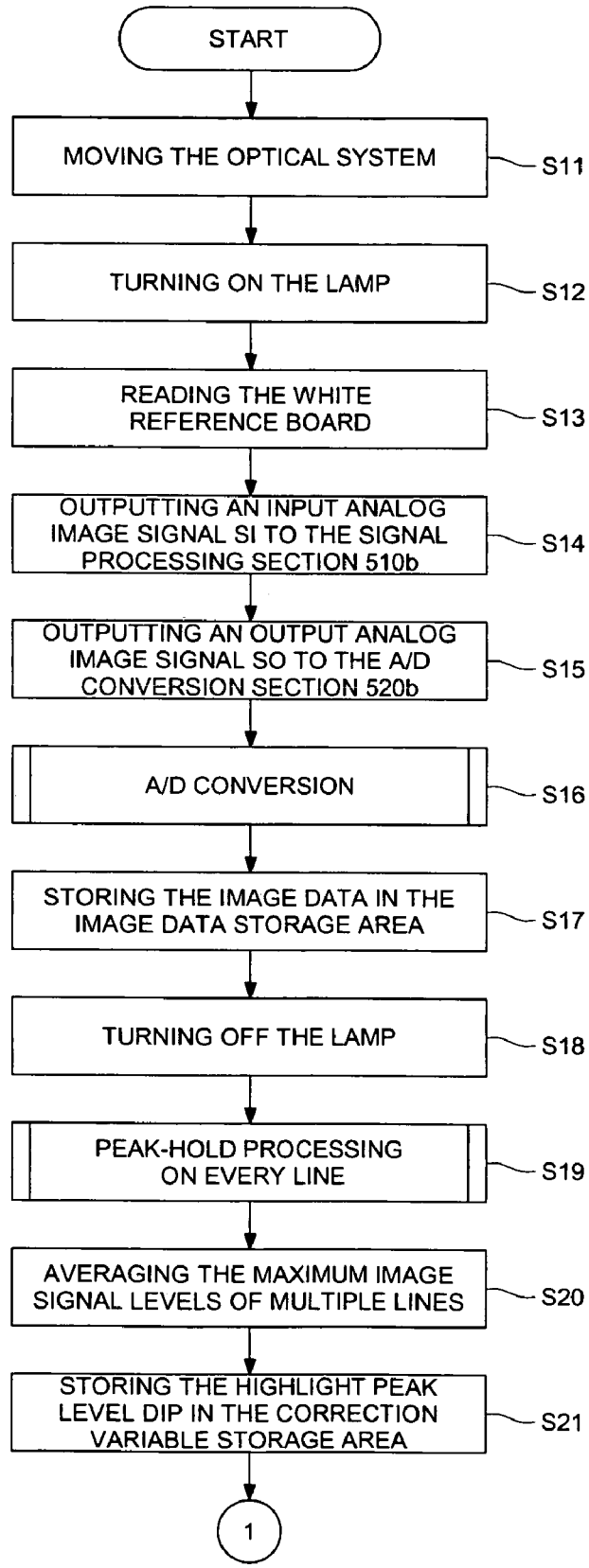
FIG. 13 shows a flowchart for calculating and setting the multiplicative value Dpx and subtractive value Dbx.
Figure 14:
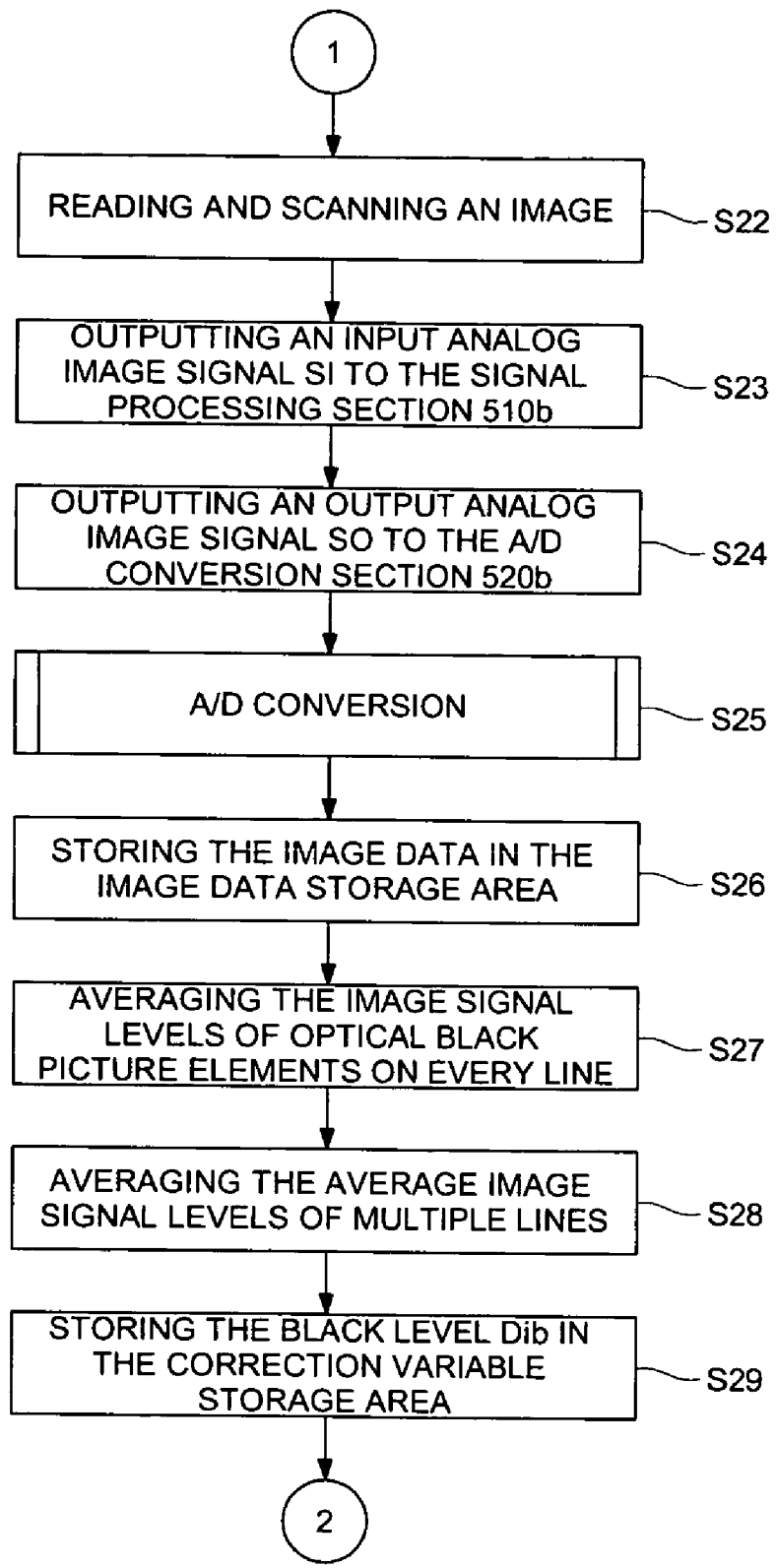
FIG. 14 shows a flowchart for calculating and setting the multiplicative value Dpx and subtractive value Dbx (continued from FIG. 13)
Figure 15:
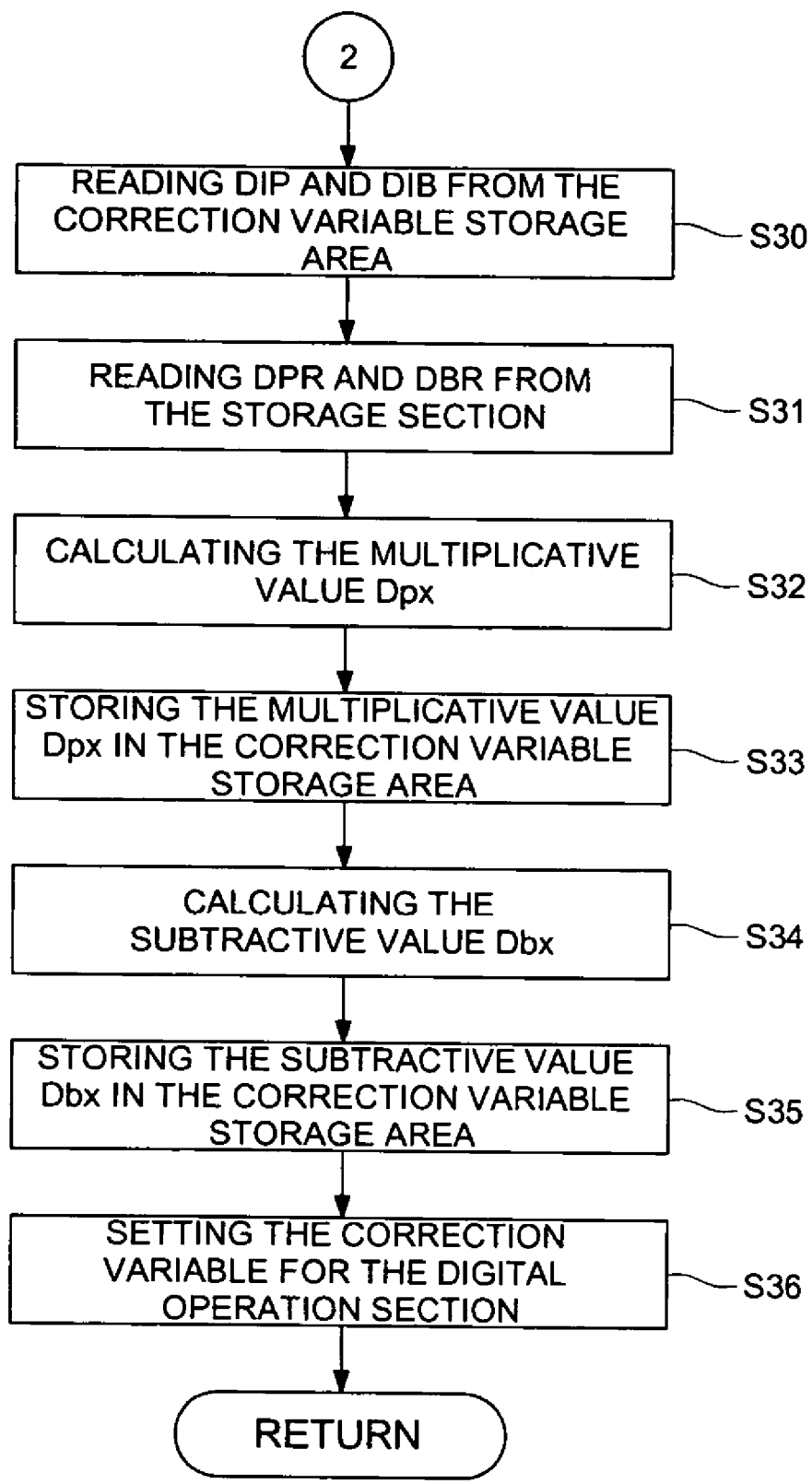
FIG. 15 shows a flowchart for calculating and setting the multiplicative value Dpx and subtractive value Dbx (continued from FIG. 14)

Each FIG. 13 to FIG. 15 shows a flowchart for calculating and setting the multiplicative value Dpx and subtractive value Dbx.

After the startup operation of each portion is finished (after the step S2 in FIG. 12), the operation for reading the white reference board is started to sense the highlight peak level Dip. The drive motor of the optical system 21 is driven; the optical system 21 is moved to the imaging position of the white reference board (step S11); and the lamp is lit (step S12).

The CCD line sensor 23 is operated; the white reference board are scanned along the preset multiple lines (for example, 128 lines); and the image data on the multiple lines are read (step S13).

The read data is outputted to the signal processing section 510b as the input analog image signal Si (step S14). The image signal level of the input analog image signal Si inputted to the signal processing section 510b is sampled and held, and outputted to the A/D conversion section 520b as the output analog image signal So (step S15).

The output analog image signal So inputted to the A/D conversion section 520b is digitalized based on the preset number of conversion steps and, after that, the amplitude of the image signal level per every picture element is calculated and then the signal is outputted to the digital signal processing section 600a as the input digital image signal Di (step S16).

The input digital image signal Di inputted to the digital signal processing section 600a is stored in the image data storage area 6141a as the image data used for sensing the highlight peak level Dip (step S17).

After the lamp is turn off (step S18), the image data stored in the image data storage area 6141a is subjected to peak-hold processing on every line (step S19).

The peak-hold processing on every line proceeds in the following manner. That is, the peak-hold value storage area 6142a is set to 0 and the image levels of the adjacent picture elements ("n"-th picture element and "n−1"-th picture element) are compared with each other. If the image signal level of the "n"-th picture element is higher than the signal level of the "n−1"-th picture element, the image signal level of the "n"-th picture element is stored in the peak-hold value storage area 6142a. The image signal level stored in the peak-hold value storage area 6142a at the time the peak-hold processing on one line has completed is the maximum image signal level of the line. This processing is performed on every line so as to sense the maximum image signal level of each line.

After the peak-hold processing on every line is complete, the maximum image signal levels of the multiple lines stored in the peak-hold value storage area 6142a are averaged (step S20).

The average maximum image signal level is stored in the correction variable storage area 6144a as the highlight peak level Dip (step S21).

Next, in order to sense the black level Dib, the CCD line sensor 23 is operated while the lamp is still held off; the white reference board are scanned along the preset multiple lines (for example, 128 lines); and the image data on the multiple lines are read (step S22).

The read data is outputted to the signal processing section 510b as the input analog image signal Si (step S23). The image signal level of the input analog image signal Si inputted to the signal processing section 510b is sampled and held, and outputted to the A/D conversion section 520b as the output analog image signal So (step S24).

The output analog image signal So inputted to the A/D conversion section 520b is digitalized based on the preset number of conversion steps and, after that, the amplitude of the image signal level per every picture element is calculated and then the signal is outputted to the digital signal processing section 600a as the input digital image signal Di (step S25).

The input digital image signal Di inputted to the digital signal processing section 600a is stored in the image data storage area 6141a as the image data used for sensing the black level Dib (step S26).

The image signal levels of preset multiple optical black picture elements (for example, 64 picture elements) of the image data stored in the image data storage area 6141a is averaged on every line and the average image signal level of each line is stored in the line black level storage area 6143a (step S27).

Then, the average image signal levels of multiple lines stored in the line black level storage area 6143a are averaged (step S28).

The average image signal level is stored in the correction variable storage area 6144a as the black level Dib (step S29).

Next, in order to calculate the multiplicative value Dpx and subtractive value Dbx, the highlight peak level Dip and black level Dib stored in the correction variable storage area 6144a are read (step S30).

The target highlight peak level Dpr and target black level Dbr stored in the storage section 614a are also read (step S31).

The multiplicative value Dpx is calculated based on the read-out highlight peak level Dip, black level Dib, target highlight peak level Dpr, target black level Dbr, and expression (2) (step S31). The calculated multiplicative value Dpx is stored in the correction variable storage section 6144a (step S33).

The subtractive value Dbx is calculated based on the calculated multiplicative value Dpx, read-out black level Dib, target black level Dbr, and expression (2) (step S34). The calculated subtractive value Dbx is stored in the correction variable storage section 6144a (step S35).

The multiplicative value Dpx and subtractive value Dbx stored in the correction variable storage section 6144a are set as the correction variables for the digital operation section 620a (step S36), and the processing returns to the main flow (returns to step S3 in FIG. 12).

In the above example according to this embodiment 1, the operation for calculating and setting the multiplicative value Dpx and subtractive value Dbx is performed after the startup operation just after the power is turned ON. It, however, can be done at any stage such as just before the start of the reading operation or according to an instruction from the operation panel so far as they have been set before the reading operation.

In the description above, it is assumed that the digital signal processing section 600a is provided in the form of software by means of an application program. However, it is also permissible to construct it in the form of hardware using a discrete device.

Figure 16:
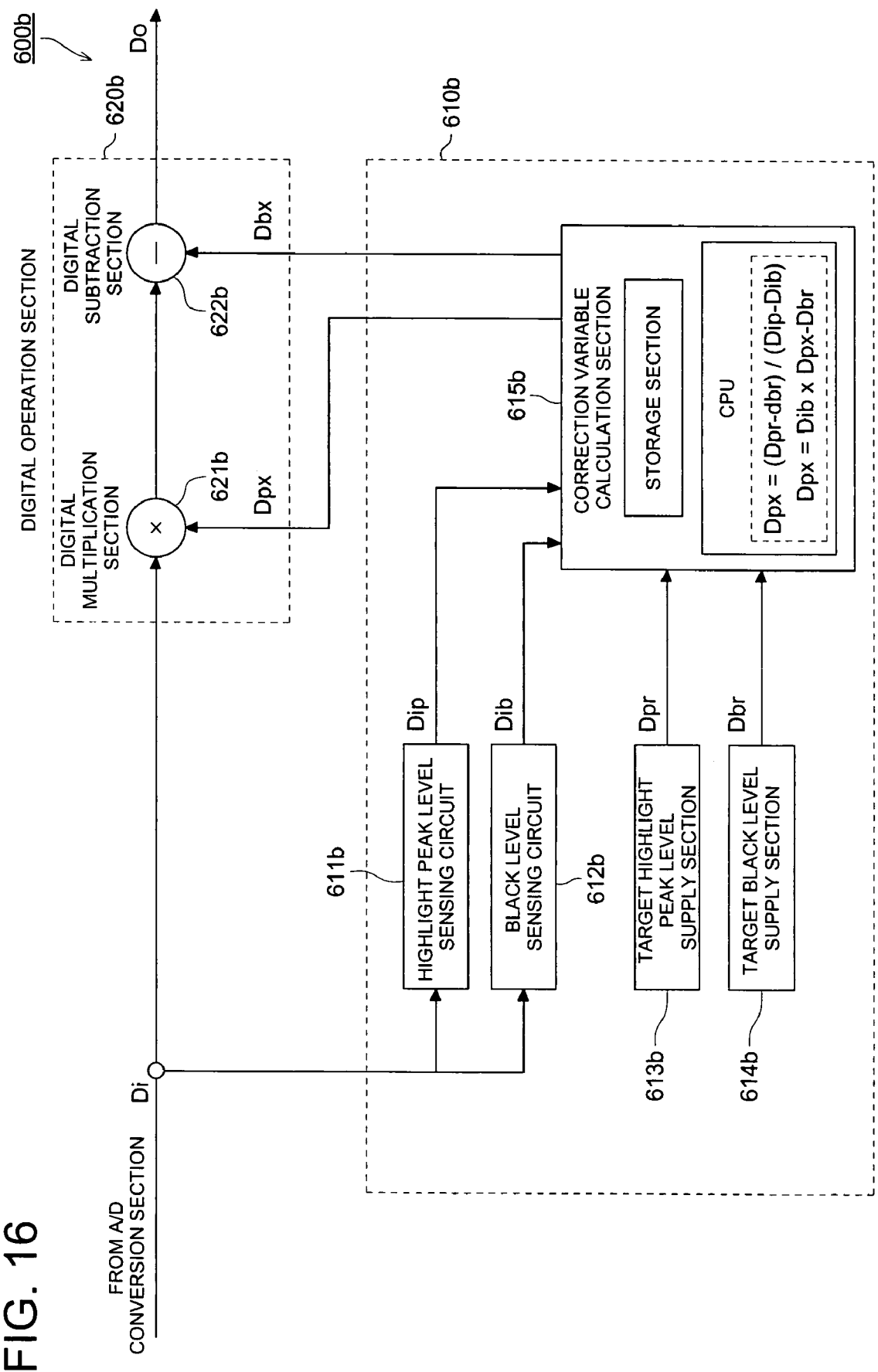
FIG. 16 shows a different construction of the digital signal processing section 600a shown in FIG. 10.

FIG. 16 shows a different construction of the digital signal processing section 600a shown in FIG. 10.

A digital signal processing section 600b in FIG. 16 is an example where part of the digital signal processing section 600a in FIG. 10 is constructed using a discrete device. In the construction of the digital signal processing section 600b, the portions that realize the concept of the digital signal processing shown in FIG. 9 are given the same symbol as in FIG. 9 but with suffix "b" and no further description is omitted.

The digital signal processing section 600b shown in FIG. 16 consists of a correction variable calculation means 610b comprising a highlight peak level sensing circuit 611b that senses the highlight peak level of the input digital image signal Di, black level sensing circuit 612b that senses the black level of the input digital image signal Di, target highlight peak level supply section 613b that supplies a potential corresponding to the target highlight peak level Dpr, target black level supply section 614b that supplies a potential corresponding to the target black level Dbr, and correction variable calculation section 615b that calculates the multiplicative value Dpx and subtractive value Dbx used for adjusting and amplifying the black level of the input digital image signal Di based on the highlight peak level Dip, black level Dib, potential corresponding to the target highlight peak level Dpr, and potential corresponding to the target black level Dbr; and a digital operation section 620b that adjusts and amplifies the black level of the input digital image signal Di based on the multiplicative value Dpx and subtractive value Dbx.

Figure 17:
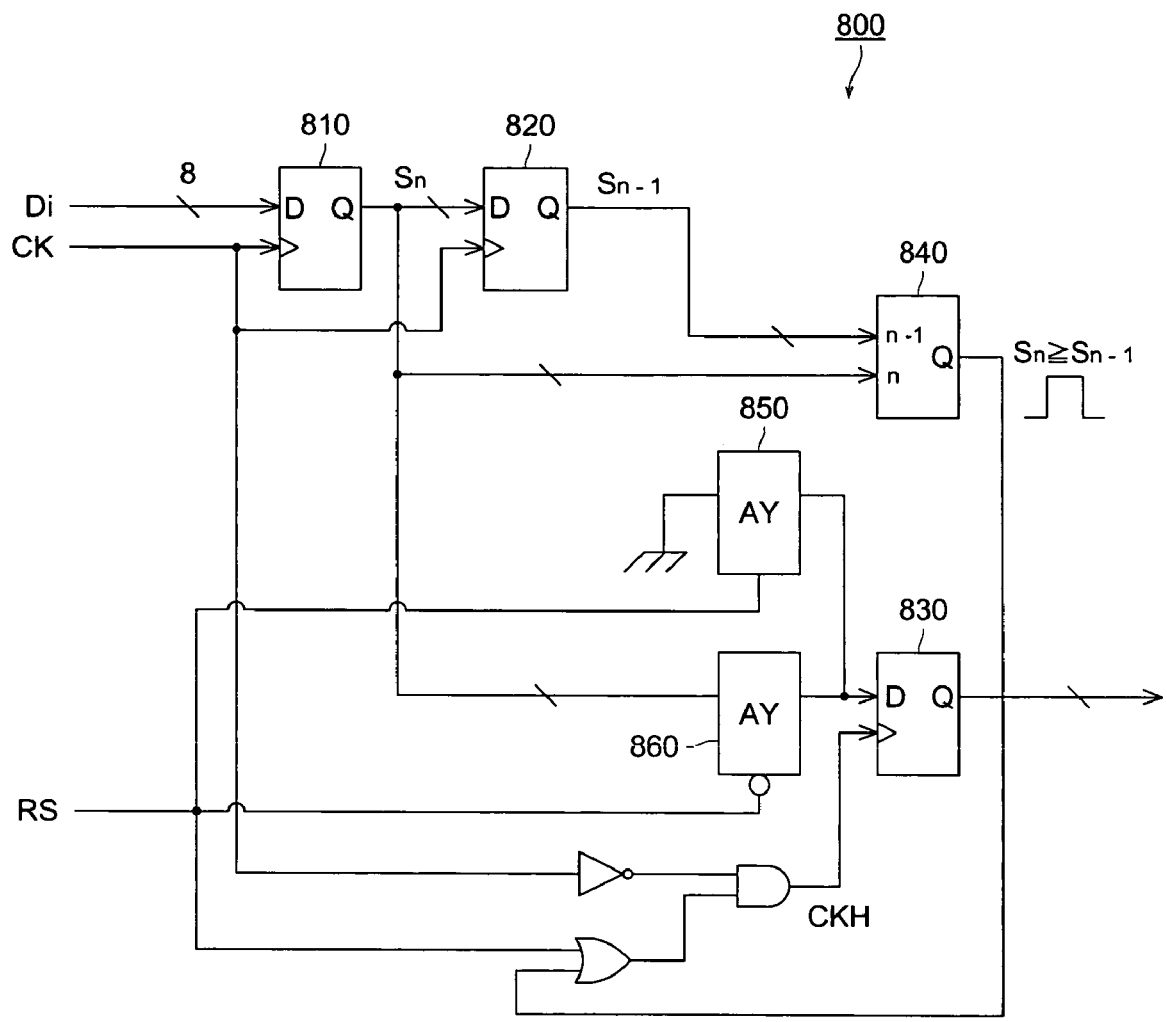
FIG. 17 shows an example of the digital peak-hold circuit 700 used in the highlight peak level sensing circuit 611b.
Figure 18:
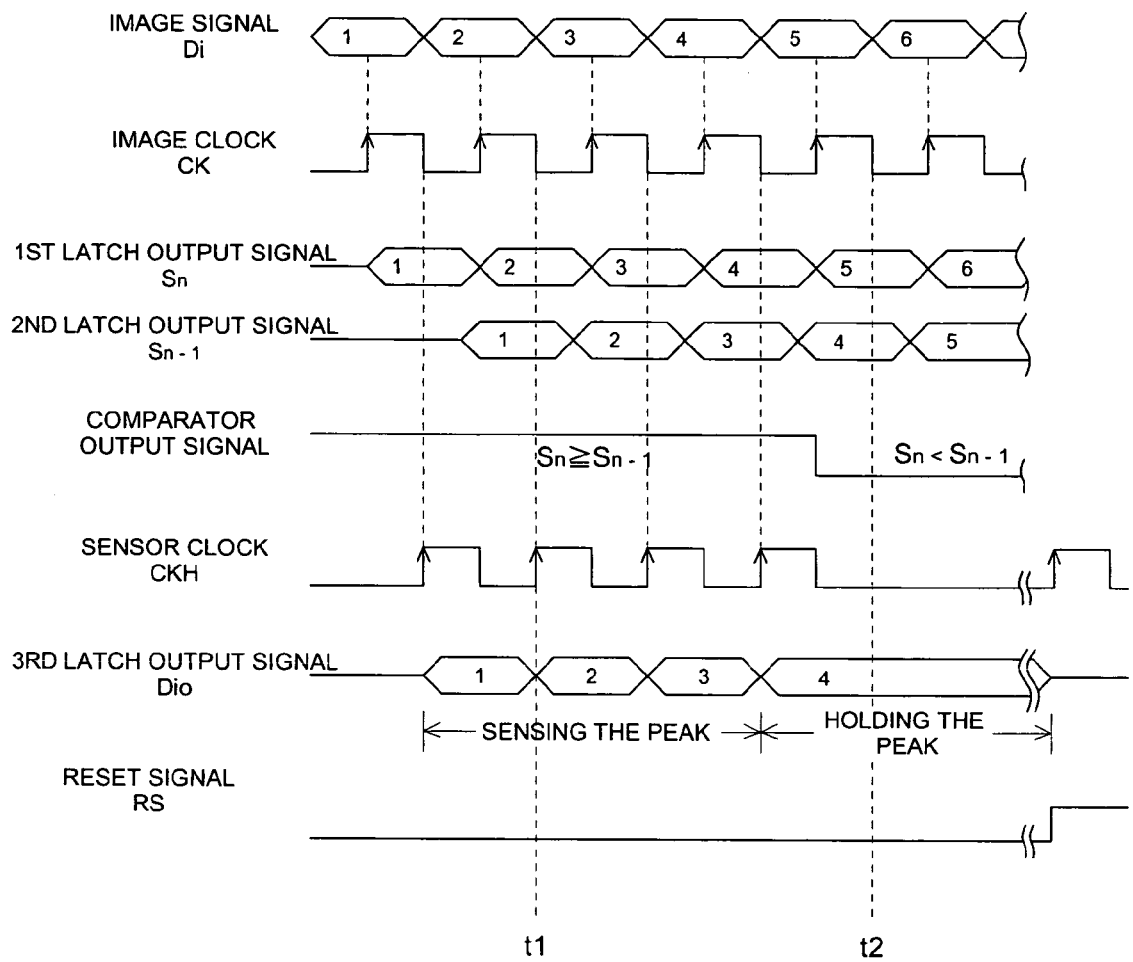
FIG. 18 shows an example of timing chart of the digital peak-hold circuit 700 in FIG. 17.

FIG. 17 shows an example of the digital peak-hold circuit 800 used in the highlight peak level sensing circuit 611b, and FIG. 18 is an example timing chart of the digital peak-hold circuit 800 in FIG. 17.

The digital peak-hold circuit 800 shown in FIG. 17 is an example of hardware construction of the peak-hold processing on each line that is performed after the white reference board is scanned and image signals are read on multiple lines (that is, the processing in the step S19 in FIG. 13).

For example, when the image signal level of the first picture element is compared with the image signal level of the adjacent second picture element at time t1 on a comparator 840 and the image signal level of the second picture element is higher than the image signal level of the first picture element, a sensor clock CKH turns "Hi" and the image level of the second picture element is outputted from the 3rd latch 830.

Then, when the image signal level of the fourth picture element is compared with the image signal level of the adjacent fifth picture element at time t2 on the comparator 840 and the image signal level of the fifth picture element is lower than the image signal level of the fourth picture element, the sensor clock CKH turns "Low" and so the image level of the fifth picture element is not outputted from the 3rd latch 830 but the image signal level of the fourth picture element is retained.

When the reset signal RS is "Low", the input signal of the 2nd tristate buffer 860 (that is, the output signal of the 1st latch 810) is outputted from the 3rd latch 830. When it is "Hi", however, the 2nd tristate buffer 860 is electrically shut off and so the signal inputted to the 3rd latch 830 becomes 0, and consequently the 3rd latch 830 is reset.

Accordingly, the clamping and amplification for adjusting the black level based on the multiplicative value Dpx and subtractive value Dbx calculated from the expression (2) and expression (3) can be digitalized, and hence a high-speed signal processing unit with improved resistivity against noise can be realized.

Embodiment 2

In this embodiment 2, a construction using an area sensor comprising multiple picture elements arranged laterally and longitudinally in place of the CCD line sensor 23 is described.

This construction is the same as in the embodiment 1 except that the example of the analog image signal outputted from the optical black picture element and effective picture element of the CCD line sensor 23 used as the imaging device, sampling and holding operation by the sample-hold circuit 514a, and the concept of the A/D conversion by the A/D conversion section 520b are different. Accordingly, further explanation using figure is omitted.

Figure 19:
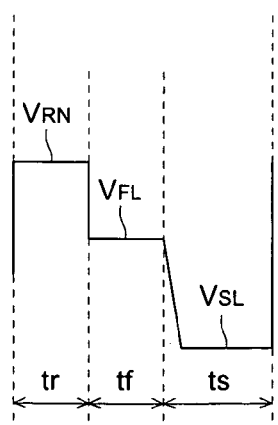
FIG. 19 shows an example of analog image signal outputted from the picture element of the CCD area sensor.

FIG. 19 is an example of analog image signal outputted from the picture element of the CCD area sensor. An analog image signal outputted from the picture element contains a reset time tr, field-through time tf, and image signal time ts. The reset time tr is a signal time in which a reset noise $V_{RN}$ is caused after a reset pulse for recognizing the picture element is inputted. The field-through time tf is a signal time in which the reset noise has been attenuated and fixed. The image signal time ts is a time in which an image signal level $V_{SL}$ of the picture element is outputted.

By sampling the field-through level $V_{FL}$ of the field-through time tf and image signal level $V_{SL}$ of the image signal time ts1 of each element, image signal is sensed.

The sample-and-hold circuit 514a samples and holds the black level and image signal level of the input analog image signal Si inputted from the pre-clamp circuit 513a and outputs the signal to the VAC circuit 515a. In the case of the CCD area sensor, the field-through level $V_{FL}$ of the field-through time tf outputted for every picture element is sampled and held as the black level.

Figure 20:
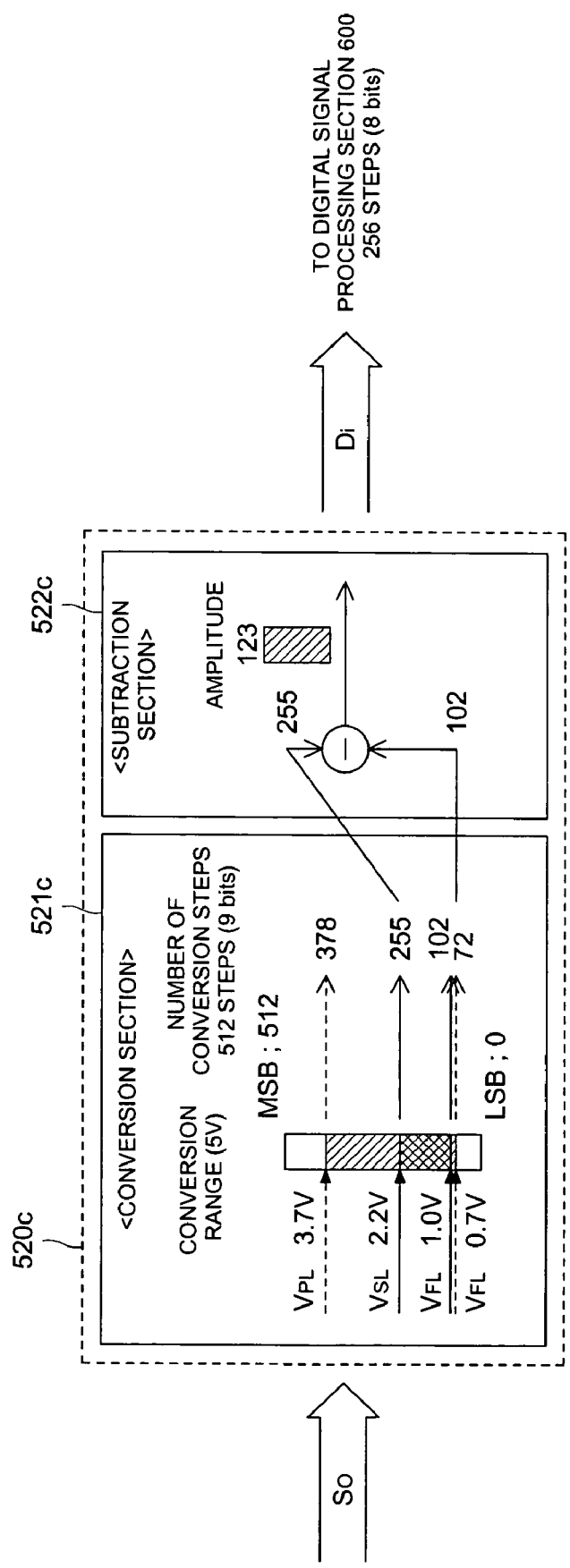
FIG. 20 shows a conceptual diagram of A/D conversion by the A/D conversion section 520c of the embodiment 2.

FIG. 20 is a conceptual diagram of A/D conversion by the A/D conversion section 520c of the embodiment 2.

As shown in FIG. 20, the A/D conversion section 520c of this embodiment 2 is equipped with a conversion section 521c as the A/D conversion means and digital subtraction section 522c as the digital subtraction means.

The conversion range of the conversion section 521c is greater than the differential between the black level and image signal level sample-and-hold values which respectively are the sampled and held black level and image signal level of the input analog image signal Si. This conversion level has been set to an allowable range from the "field-through level $V_{FL}$ containing a direct-current component" to the "highlight peak level $V_{PL}$ containing a direct-current component" at the design stage of the A/D conversion section 520c.

The "highlight peak level $V_{PL}$ containing a direct-current component" is the maximum of image data that is obtained by taking an image of a white reference board of which spectral characteristic is uniform under a visual light differently from the contact glass where a document is placed and of which reflection factor is higher than normal document. It is obtained by peak-holding the image signal level $V_{SL}$ of the picture elements of a single scan obtained by taking an image of the white reference board. In order to remove noise, an average of the peak-hold levels of multiple lines is regarded as the "highlight peak level $V_{PL}$ containing a direct-current component".

The "field-through level $V_{FL}$ containing a direct-current component" is an average of the field-through levels $V_{FL}$ of multiple image signals.

The conversion range of the A/D conversion section 520c has been set wide enough so as not to exceed the range from the "field-through level $V_{FL}$ containing a direct-current component" to the "highlight peak level $V_{PL}$ containing a direct-current component", including the dispersion thereof, that is obtained by taking an image of the white reference board experimentally at the design stage of the circuit.

The number of conversion steps Na of the conversion section 521c is determined according to the expression (4) below based on the number of signal steps Nt required in the digital signal processing section 600 in the next stage, conversion range R preset at the design stage of the A/D conversion section 520c, and maximum amplitude $R_{max2}$ of the output analog image signal So calculated from the difference between the highlight peak level $V_{PL}$ and field-through level $V_{FL}$ obtained at the design stage.

$$Na \geq Nt \times (R/R_{max2}) \quad \text{Expression (4)}$$

For example, if the number of signal steps Nt is 256 (8 bits), conversion range is 5V, and maximum amplitude $R_{max2}$ is 3V, the necessary number of conversion steps Na calculated from the expression (4) turns to be about 1.7 times or more of 256 (8 bits). Accordingly, the number of conversion steps Na is set to 436 or more, and the number of bits for the A/D conversion is set to 9 bits.

Since the number of conversion steps Na is calculated according to the expression (4), digital data in desired accuracy can be obtained without lowering the number of signal steps even if the amplitude of the input analog image signal Si outputted from the CCD area sensor is low.

The digital subtraction section 522c subtracts the digital image signal of the black level sample-and-hold value and digital image signal of the image signal level sample-and-hold value outputted from the conversion section 521b, and calculates the amplitude of the output analog image signal So.

When a document is being scanned and read, the digital subtraction section 522c subtracts the digital value of the field-through level $V_{FL}$ and digital value of the image signal level $V_{SL}$ of every picture element converted in the conversion section 521c, and calculates the amplitude for each picture element. The calculated amplitude is then outputted to the digital signal processing section 600 as the input digital image signal Di.

For example, when a document is being scanned and read, if the conversion range R is 5V and the number of conversion steps Na is 512 (9 bits), the output analog image signal So having the field-through level $V_{FL}$ of 1.0V and image signal level $V_{SL}$ of 2.2V is converted in the conversion section 521c so that the field-through level $V_{FL}$ becomes a digital value of 102 and image signal level $V_{SL}$ becomes a digital value of 225. Then, they are subtracted in the digital operation section 522c and the signal amplitude of the picture element is calculated to be 123. The calculated signal amplitude (123) is outputted as the input digital image signal Di.

That is to say, by specifying the conversion range and number of conversion steps at the design stage of the A/D conversion section 520c, assuming the output analog image signal So to be inputted, a signal processing unit that can improve the noise resistance of the image data obtained from the CCD area sensor and transmit the image data accurately can be realized.

The descriptions in the above embodiments simply represent a preferred example of the image processing unit of the present invention is not limited thereto.

In addition, detailed construction and operation at each portion of the above embodiments is modifiable, if necessary, so far as the intent of the present invention is followed.

Disclosed embodiment can be varied by a skilled person without departing from the spirit and scope of the invention.

What is claimed is:

1. An apparatus for processing signals, comprising:
   a sample-and-hold section to sample and hold a black signal level and an image signal level, both of which are included in an analogue image signal inputted from an image capturing element;
   an analogue-to-digital converting section to convert said analogue image signal to digital image data within a predetermined number of conversion steps, said predetermined number being larger than a number of conversion steps corresponding to a differential value between said black signal level and said image signal level acquired by said sample-and-hold section;
   a digital subtracting section to subtract black digital-image data representing said black signal level from signal digital-image data representing said image signal level, and to output digital-image data and resulting from the subtraction, said black digital-image data and said signal digital-image data being converted by said analogue-to-digital converting section; and
   a digital image data processing section to process said digital image data outputted by said digital subtracting section;
   wherein said predetermined number of conversion steps is calculated according to the relationship:

$Na \geq Nt \times (R/R\max)$, where:
   Na is said predetermined number of conversion steps,
   Nt is a number of signal steps acquired by said digital image data processing section,
   R is a predetermined conversion range established in advance for said analogue-to-digital converting section, and
   Rmax is a maximum amplitude of said analogue image signal inputted from said image capturing element.

2. The apparatus of claim 1, wherein said image capturing element comprises a line sensor in which a plurality of optical black pixels and effective pixels are arrayed in a line; and
   wherein said sample-and-hold section samples and holds, as said black signal level, one of: an image signal level of said plurality of optical black pixels, and a field through level, which appears during a field through period of said analogue image signal for every pixel.

3. The apparatus of claim 1, wherein said image capturing element comprises an area sensor in which a plurality of optical black pixels and effective pixels are two-dimensionally arranged in an image area; and
   wherein said sample-and-hold section samples and holds, as said black signal level, one of: an image signal level of said plurality of optical black pixels, and a field through level, which appears during a field through period of said analogue image signal for every pixel.

4. An apparatus for processing signals, comprising:
   a sample-and-hold section to sample and hold a black signal level and an image signal level, both of which are included in an analogue image signal inputted from an image capturing element;
   an analogue-to-digital converting section to convert said analogue image signal to digital image data within a predetermined number of conversion steps, said predetermined number being larger than a number of conversion steps corresponding to a differential value between said black signal level and said image signal level acquired by said sample-and-hold section;
   a digital subtracting section to subtract black digital-image data representing said black signal level from signal digital-image data representing said image signal level, and to output digital image data resulting from the subtraction, said black digital-image data and said signal digital-image data being converted by said analogue-to-digital converting section;
   a digital image data processing section to process said digital image data outputted by said digital subtracting section;
   wherein said digital image data processing section includes:
      a highlight peak-level detecting section to detect and hold a highlight peak level included in said digital image data outputted by said digital subtracting section;
      a black level detecting section to detect and hold said black signal level included in said digital image data outputted by said digital subtracting section;
      a target-highlight peak-level supplying section to supply a target-highlight peak-level to be established for said digital image data outputted by said digital subtracting section;
      a target black-level supplying section to supply a target black-level to be established for said digital image data outputted by said digital subtracting section;
      a correction-value calculating section to calculate correction values, which are employed for adjusting said black signal level included in said digital image data outputted by said digital subtracting section and for amplifying said digital image data, based on said highlight peak level detected by said highlight peak-level detecting section, said black signal level detected by said black level detecting section, said target-highlight peak-level supplied by said target-highlight peak-level supplying section and said target black-level supplied by said target black-level supplying section; and
      a digital arithmetic section to adjust said black signal level included in said digital image data outputted by said digital subtracting section and to amplify said digital image data, based on said correction values calculated by said correction-value calculating section.

5. The apparatus of claim 4, wherein said correction values calculated by said correction-value calculating section include a multiplying value, based on which said digital image data outputted by said digital subtracting section is amplified, and a subtracting value, based on which a black signal level of digital image data amplified according to said multiplying value is adjusted.

6. The apparatus of claim 5, wherein said multiplying value is calculated by the equation:

$Dpx = (Dpr - Dbr)/(Dip - Dib)$, where:
- Dpx is said multiplying value,
- Dip is said highlight peak level detected by said highlight peak-level detecting section,
- Dib is said black signal level detected by said black level detecting section,
- Dpr is said target-highlight peak-level supplied by said target-highlight peak-level supplying section, and
- Dbr is said target black-level supplied by said target black-level supplying section.

7. The apparatus of claim 6, wherein said subtracting value is calculated by the equation:

$$Dbx = Dib \times Dpx - Dbr,$$

where Dbx is said subtracting value.

* * * * *